United States Patent
Kalifa et al.

(10) Patent No.: US 7,139,420 B2
(45) Date of Patent: Nov. 21, 2006

(54) METHOD FOR TOMOGRAPHIC RECONSTRUCTION WITH NON-LINEAR DIAGONAL ESTIMATORS

(75) Inventors: Jerome Kalifa, Paris (FR); Andrew Laine, New York, NY (US); Peter Esser, Smithtown, NY (US)

(73) Assignee: The Trustees Of Columbia University In The City Of New York, New York, NY (US)

( * ) Notice: Subject to any disclaimer, the term of this patent is extended or adjusted under 35 U.S.C. 154(b) by 716 days.

(21) Appl. No.: 10/258,220

(22) PCT Filed: Apr. 30, 2001

(86) PCT No.: PCT/US01/13737

§ 371 (c)(1),
(2), (4) Date: Jun. 24, 2003

(87) PCT Pub. No.: WO01/84500

PCT Pub. Date: Nov. 8, 2001

(65) Prior Publication Data

US 2004/0028264 A1    Feb. 12, 2004

Related U.S. Application Data

(60) Provisional application No. 60/201,679, filed on Apr. 28, 2000, provisional application No. 60/222,871, filed on Aug. 3, 2000.

(51) Int. Cl.
*G06K 9/00* (2006.01)
(52) U.S. Cl. ............................ 382/133; 378/4; 378/901
(58) Field of Classification Search ................ 382/128, 382/129, 130, 131, 132–134; 600/425; 250/363.04; 324/9.4; 378/4, 21, 22, 23, 24, 25, 26, 27, 378/28, 901
See application file for complete search history.

(56) References Cited

U.S. PATENT DOCUMENTS 5,841,890 A   11/1998   Kraske .................. 382/131
5,953,388 A    9/1999   Walnut et al. .............. 378/4

OTHER PUBLICATIONS

Kalifa, J., et al., "Thresholding estimators for minimax restoration and deconvolution", Proceedings of the IEEE-EURASIP Workshop on Nonlinear Signal and Image Processing (NSIP '99), Proceedings of the IEEE-EURASIP Workshop on Nonlinear Signal and Image Processing (NSIP '99), Antalaya, Turkey, Jun. 20-23, 1999, pp. 1-5, vol.

Kalifa, J., et al., "Image deconvolution in mirror wavelet bases", Proceedings 1998 International Conference on Imag Processing. ICIP98 (CAT. No. 98CB36269), Proceedings of IPCIP '98 International Conference on Image Processing, Chicago, IL, USA, Oct. 4-7, 1998, pp. 565-569, vol. 1.

*Primary Examiner*—Matthew C. Bella
*Assistant Examiner*—Abolfazl Tabatabai
(74) *Attorney, Agent, or Firm*—Baker Botts L.L.P.

(57) ABSTRACT

Techniques for tomographic reconstruction using non-linear diagonal estimators are disclosed. In a preferred embodiment, tomographic data from a tomographic device is decomposed in a wavelet vector family. Regularization of the tomographic data is accomplished by performing a thresholding operation on coefficients of the decomposed data. The regularized data is reconstructed into image data that may he displayed. In another preferred embodiment, a wavelet packet vector family is used to decompose the tomographic data. The wavelet packet is selected from a dictionary of wavelet packets using the best basis algorithm.

15 Claims, 5 Drawing Sheets

METHOD FOR TOMOGRAPHIC RECONSTRUCTION WITH NON-LINEAR DIAGONAL ESTIMATORS

RELATED APPLICATION

This application claims priority from U.S. provisional application Nos. 60/201,679 and 60/222,871 filed on Apr. 28, 2000 and Aug. 3, 2000 respectively, which are both incorporated herein in their entirety.

BACKGROUND OF INVENTION

Computerized tomography has been used for many years, especially in the area of medical imaging, for providing nondestructive or noninvasive techniques for generating sectional views of an object. A good description of such systems appears in U.S. Pat. No. 5,414,622, which is incorporated herein by reference. These imaging systems measure the density or metabolic activity of a section of the observed object (such as a patient's body) and produce raw acquisition data. This acquisition data consists of tomographic projections or is processed to obtain tomographic projections, which may be used in a tomographic reconstruction procedure to obtain image data associated with a sectional view of the observed object. These techniques are presently employed in medical imaging systems such as X-ray computerized tomography (CT) systems, positron emission tomography (PET) systems and Single Positron Emission Computerized Tomography (SPECT) systems. Applications in fields other than medical imaging include seismology and geophysical sciences where ground penetrating acoustic radiation is employed and reflected signals are processed to obtain tomographic projections of subsurface structures. Other applications will be apparent to one skilled in the art.

These systems can be described mathematically as follows. A section of the object to be observed by the tomographic device is represented by an image $f_c$ ($x_1$, $x_2$), where $x_1$ and $x_2$ are the spatial dimensions of the image. In the discrete case, f is an image matrix with $N_1 \times N_2$ elements and each member of f includes pixel information such as, grayscale value or brightness. An estimation of f is derived by a tomographic reconstruction procedure from the tomographic projections of f, denoted Y[t,a], and defined as:

$$Y[t,\alpha]=Rf[t,\alpha]+W[t,\alpha] \qquad \text{(Eq. 1)}$$

where W is an additive noise, R is the discrete Radon transform, which models the tomographic projection process, a is the angle of projection and t is the position on the line integral. The discrete Radon transform is derived from its continuous version $R_c$, which is equivalent to the X-ray transform in two dimensions described in S. R. Deans, The Radon Transform And Some Of Its Applications (John Wiley and Sons) (1983) and expressed as $$(R_c f_c)(t, \alpha) = \int_{-\infty}^{\infty}\int_{-\infty}^{\infty} f_c(x_1, x_2)\delta(x_1\cos\alpha + x_2\sin\alpha - t)dx_1\,dx_2 \qquad \text{(Eq. 2)}$$

where $f_c$ is a square integrable function δ is the Dirac mass function where δ(x)=1 when x=0 and δ(x)=0 otherwise and a is an angle from 0 to $2\pi$ radians. FIG. 5 is a diagram showing a typical relationship between R,f t and α.

One skilled in the art will recognize that there are several ways to define the discrete Radon transform based on the continuous Radon transform. Some of those methods are described in P. Toft, The Radon Transform and Implementation, Ph.D. thesis, Department of Mathematical Modeling, Technical University of Denmark (1996). Typically, a line integral along $x_1$ cos α+$x_2$ sin α=t is approximated by a summation of the pixel values inside the strip t−½≦$n_1$ cos α+$n_2$ sin α≦t+½.

The noise W from Eq. 1 is traditionally modeled as Gaussian or Poisson noise. However, since the tomographic projections Y are often processed to incorporate various corrections, such as attenuation correction, scatter correction, resolution correction and geometric correction, the resulting noise W does not actually comply with such statistical models.

Once tomographic projections are obtained, reconstruction of the desired image data proceeds in two steps. The steps may-be performed in either order. The first of these steps is backprojection. This step entails computing the inverse radon transform $R^{-1}$) of the tomographic projections Y. A discrete backprojection may be directly computed by (a) radial interpolation, using techniques well known to one skilled in the art and (b) deconvolution to amplify the high frequency components of the 1-dimensional Fourier transforms of Y in the direction of t by multiplying the 1-dimensional Fourier transforms of Y in the direction of t by a high-pass filter, such as a ramp filter.

Second, regularization if performed. It follows from Eq. 1 that computing the inverse Radon transform of the tomographic projections yields:

$$R^{-1}(Y)=f+R^{-1}(W), \qquad \text{(Eq. 3)}$$

Where the desired image f is contaminated by additive noise $R^{-1}$(W). Because the Radon transform R is a smoothing transform, computing its inverse $R^{-1}$ in the presence of additive noise W is an ill-posed inverse problem, so $R^{-1}$(W) represents a large additive noise. Consequently, the regularization step is necessary to remove as much of the additive noise as possible from the final reconstructed data.

The prior art teaches two approaches to regularization, both of which suffer shortcomings. The most popular regularization technique in the prior art is known as Filtered Back-Projection (FBP). FBP and its derivatives are linear filtering techniques in the Fourier space. FBP suffers from limitations due to the fact that the vectors of the Fourier basis are not adapted to represent spatially inhomogeneous data typically found in images. The second well-known technique for regularization utilize iterative statistical models (NSM) designed to implement Expectation-Maximum (EM) and Maximum A Posteriori (MAP) estimators. These techniques are described in G. McLachlan and T. Krishnan, The EM Algorithm and Extensions (New York:Wiley) (1997) and L. A. Shepp and Y. Vardi, Maximum Likelihood Reconstruction For Emission Tomography, Transactions on Medical Imaging, 1982, at 113–122. Although ISM methods can show an improvement over FBP techniques, they suffer from several drawbacks, including long computation times, lack of theoretical understanding to characterize estimation error and convergence problems.

SUMMARY OF THE INVENTION

It is an object of the present invention to provide improved methods for regularization of tomographic projection data.

In one embodiment of the present invention, a method is provided for reconstructing image data corresponding to a cross-section of an object, such as a patient. Tomographic projection data supplied by a tomographic device is backprojected. The backprojected data is decomposed in a wavelet or wavelet packet vector family. The decomposed data is then diagonally operated upon and the modified data is then recomposed to form image data corresponding to the desired image by inverting the wavelet vector decomposition. In a highly preferred embodiment, the diagonal operation consists of thresholding the decomposed data to attenuate or eliminate certain decomposition coefficients.

In another preferred embodiment of the present invention, the supplied tomographic projection data is first decomposed in a wavelet or wavelet packet vector family. The decomposed data is then diagonally operated upon. Next, the data is recomposed by inverting the wavelet vector decomposition. Finally, the data is backprojected to form image data corresponding to the desired image.

In another embodiment, the supplied tomographic data is decomposed and diagonally operated upon as described above. The data is then selectively amplified to approximate the deconvolution step of backprojecting the data. The data is then recomposed by inverting the wavelet vector decomposition and the resulting data is radially interpolated to form image data corresponding to the desired image. In a further embodiment, the selective amplification can occur before the diagonally operating step.

In a highly preferred embodiment, the wavelet or wavelet packet vector family chosen to decompose the tomographic data is a wavelet packet family. A dictionary of wavelet packet decompositions to choose is provided. One of those decompositions is selected by calculating an estimation of final estimation error based on the selected wavelet packet decomposition and a model of the noise in the tomographic projection data for each possible wavelet packet decomposition and choosing the wavelet packet decomposition with the minimum estimated estimation error. In another preferred embodiment, the model of the noise in the tomographic projection data is extracted from the tomographic projection data. In yet another preferred embodiment, prior information about the desired image gained from analysis of previous similar images, e.g. of "phantoms", is used to calculate the estimated estimation error.

In another preferred embodiment, tomographic information corresponding to multiple cross-sections of an object, such as a patient, is provided and the desired image is reconstructed using all of the supplied data.

DETAILED DESCRIPTION OF THE PREFERRED EMBODIEMENTS

Figure 1:
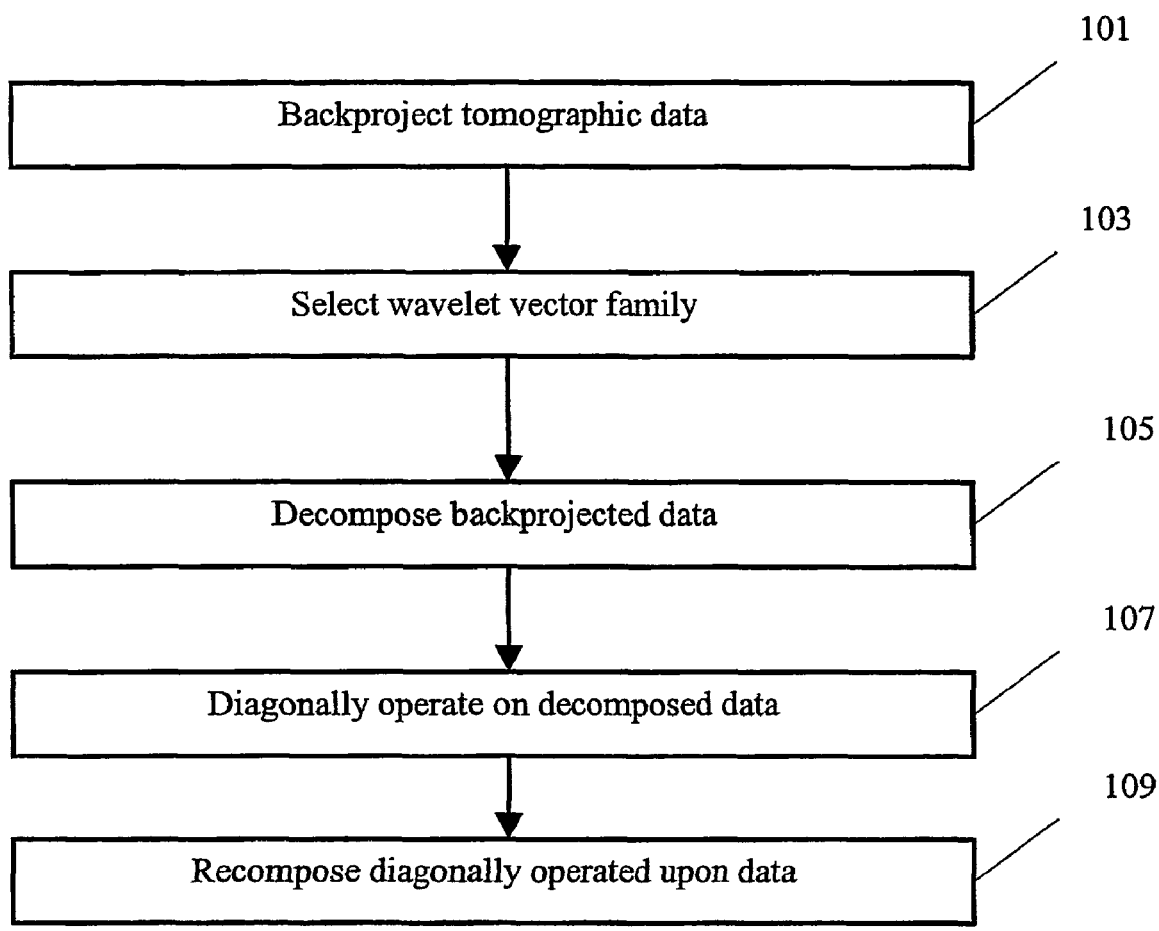
FIG. 1 shows a flow diagram of one embodiment of a method according to the present invention.

FIG. 1 shows one method of implementing the present invention. In step 101, tomographic data generated by a tomographic device such as an X-ray CT scanner, PET or SPECT device is supplied and backprojected. The tomographic data may be raw, or may be pre-processed to correct for attenuation, scatter, resolution, geometric anomalies, etc. These pre-processing methods are well known to one skilled in the art. The backprojection step, as previously described, involves radially interpolating the data as well as deconvolving the data. Radial interpolation is well known to one skilled in the art. In the preferred embodiment, linear interpolation is performed, however other radial interpolation techniques such as the nearest neighbor or spline radial interpolation algorithms can be utilized. Deconvolution is also well known to one skilled in the art and consists of multiplying the one dimensional Fourier transform of the projection data in the direction of t by multiplication by a high-pass filter such as a ramp filter. The entire backprojecting step is described in detail in U.S. Pat. Nos. 5,778,038 and 5,414,622, incorporated herein by reference. Attached as Appendix A is a MATLAB™ code listing implementing one embodiment of the present invention. The backprojecting steps are performed during the function filtback in the code.

In step 103, a wavelet or wavelet packet vector family is selected to decompose the backprojected data. Either one-dimensional or two-dimensional wavelet vector families can be used. The wavelet or wavelet packet vector family can be an orthogonal basis, a biorthogonal basis or a complex or non-complex frame. A biorthogonal basis differs from an orthogonal basis in that the vector family used to reconstruct the data (denoted g * herein) is different than the vector family used to decompose the data (denoted g herein). Biorthogonal bases are preferable when particular properties of the wavelet vectors or wavelet packet vectors, such as support size, regularity, symmetry and number of vanishing moments are difficult or impossible to achieve using a orthogonal basis. Selection of a wavelet packet vector family allows a more flexible and accurate segmentation of the frequency domain, as the supports of the Fourier transforms of the wavelet packets nearly segment the frequency space. Complex wavelet frames and complex wavelet packets are translation invariant transforms that generate complex coefficients. These vector families provide improved directional selectivity. All of these vector families will be known to one skilled in the art and are described in S. Mallat, A Wavelet Tour of Signal Processing (Academic Press, 2d Ed.) 1999. The chosen vector family is denoted B herein. In a preferred embodiment demonstrated by the code in Appendix A, a two dimensional wavelet packet decomposition based on the Symmlet wavelet is used.

Figure 4:
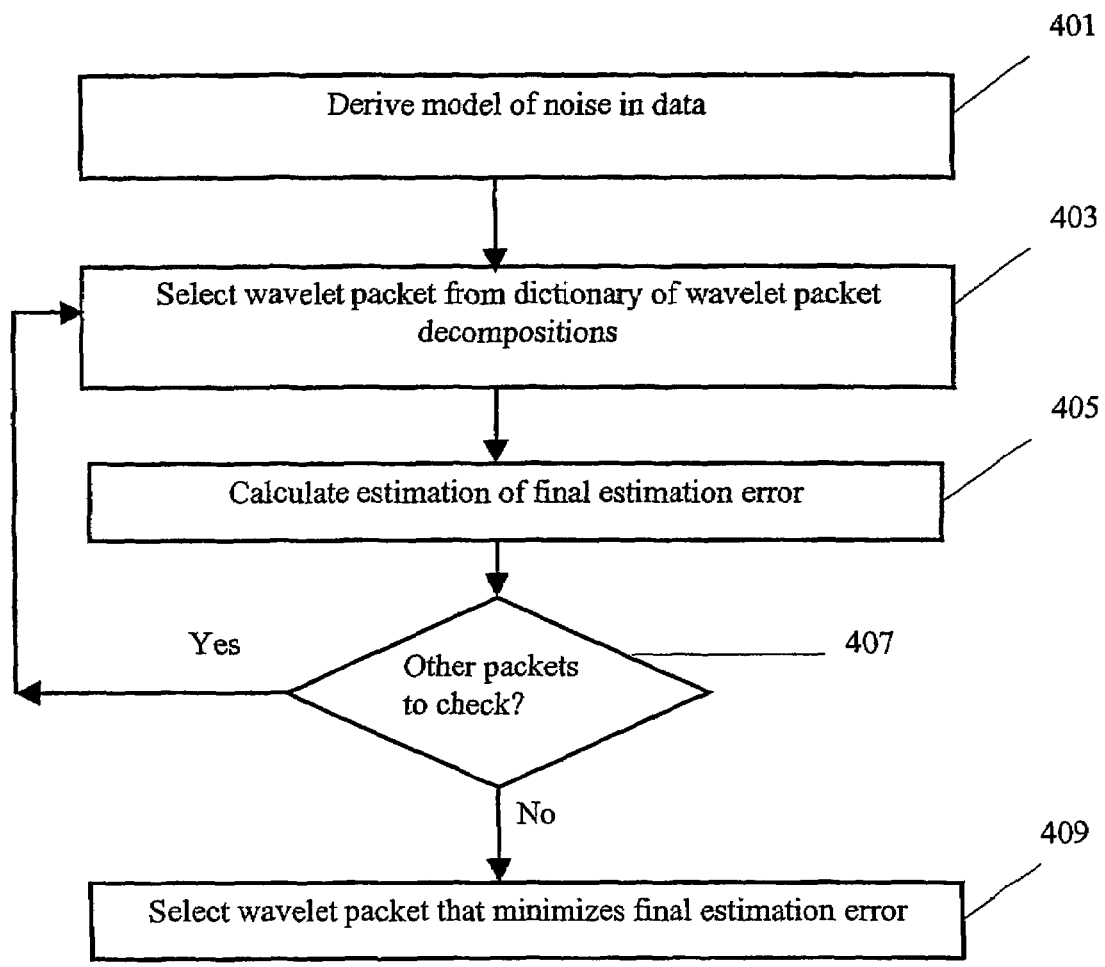
FIG. 4 shows a flow diagram of a preferred wavelet family selection step useful in the methods of FIGS. 1–3.
Figure 5:
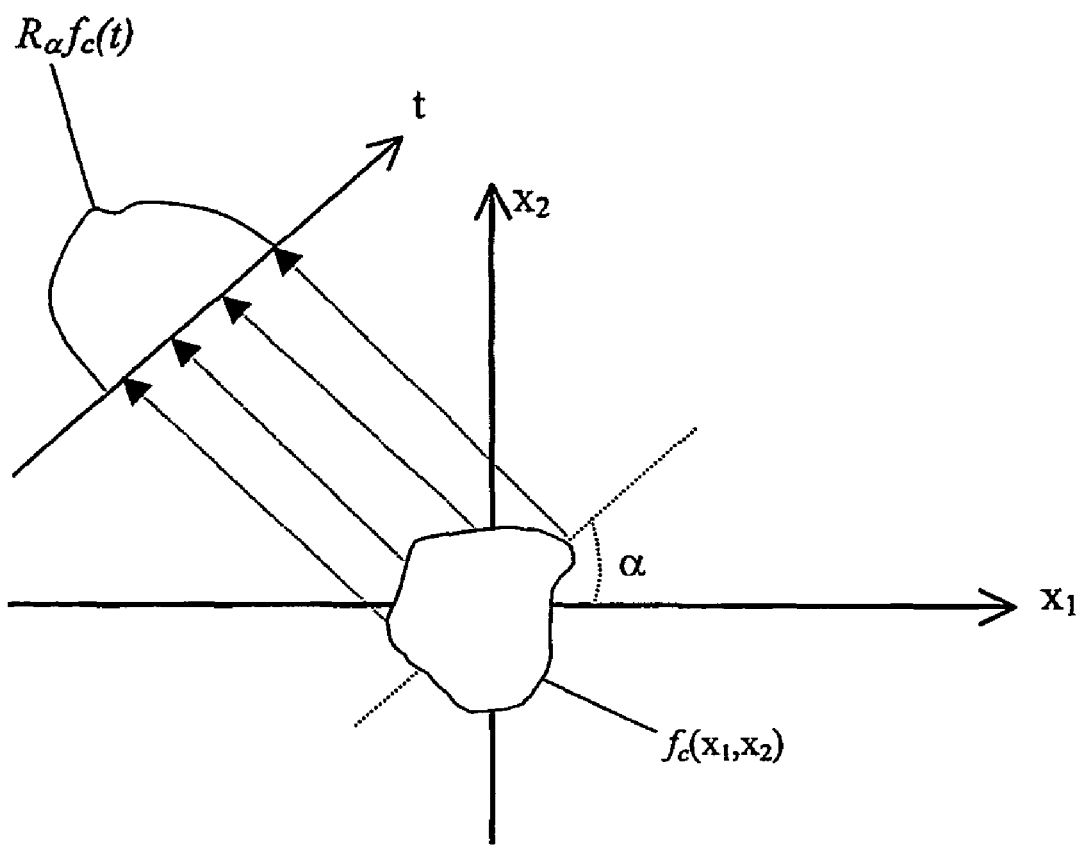
FIG. 5 shows a conceptual relationship between an object to be imaged and a portion of its Radon transform.

Referring to FIG. 4, a highly preferred embodiment of the vector family selection step 103, where the vector family chosen is a one or two dimensional wavelet packet frame, will be described. The function SPEC-MacrTomoFiltback in the MATLAB™ code listing contained in Appendix A implements the steps involved in the embodiment illustrated in FIG. 4 using a two dimensional wavelet packet frame and provides further description of the steps illustrated in FIG. 4. In step 401, a model of the noise in the tomographic projection data is derived. The model may be predetermined, or it may be determined from information extracted from the tomographic projection data. A dictionary of potential wavelet packet decompositions is also supplied. Generating the dictionary of wavelet packet decompositions is well known to one skilled in the art. In step 403, a possible wavelet packet decomposition is selected from the supplied dictionary. In step 405, an estimation of the final estimation error of the reconstructed image based on the selected wavelet packet decomposition and noise model is calculated. In step 407, the process repeats from step 403 if other potential wavelet packet decompositions in the supplied dictionary remain to be analyzed.

In step 409, the wavelet packet decomposition that minimizes estimated final estimation error is chosen.

An algorithm for selecting the wavelet packet which minimizes the estimated final error as shown in steps 405 and 409 is well known in the art and is described in R. Coifman and M. Wickerhauser, *Entropy-Based Algorithms for Best Basis Selection*, 38 IEEE Trans. Info. Theory, 713 (Mar. 1992) and in U.S. Pat. Nos. 5,526,299 and 5,384,725 which are incorporated by reference herein. Generating a criterion to employ in implementing the algorithm of Coifman and Wickerhauser that estimates the estimation error based on a model on the noise in the tomographic projection data is well known to one skilled in the art and is described in S. Mallat, A Wavelet Tour of Signal Processing (Academic Press 2d Ed.) (1999). Although not shown in FIG. 4, as noted in the code listing of Appendix A, the criterion can be based on information about the image to be observed in addition to information about the noise in the tomographic projection data by making reference to a prior observation, e.g. of a "phantom", of an object similar to the object under investigation.

Returning to FIG. 1, in step 105, the backprojected tomographic data is decomposed into vector family B. The algorithms employed to decompose the data are well known to one skilled in the art and will depend on the vector family chosen. In the preferred embodiment implemented in the code listing of Appendix A, a fast filter-bank transform is used. A fast lifting scheme may also be employed. Fast filter bank transforms are well known to one skilled in the art and are described in S. Mallat, supra. Lifting schemes are also well known to one skilled in the art and are described in W. Sweldens, *The lifting Scheme: A Construction of Second Generation Wavelets*, 29 SIAM J. of Math. Analysis 511, 546 (1997). Techniques for decomposing in other wavelet vector families, using other filter bank techniques such as translation averaging are also possible.

In step 107, the decomposed data is diagonally operated on. This step consists of multiplying the decomposed data coefficient by a scalar value $\rho_i$. In a preferred embodiment, $\rho_i$ is a thresholding operator $T_i$, defined:

$$\rho_i(x) = \begin{cases} x & \text{if } |x| > T_i \\ 0 & \text{if } |x| \leq T_i \end{cases}, \text{ or} \quad \text{(Eq. 4)}$$

$$\rho_i(x) = \begin{cases} x - T_i & \text{if } x \geq T_i \\ x + T_i & \text{if } x \leq -T_i \\ 0 & \text{if } |x| < T_i \end{cases}, \text{ or} \quad \text{(Eq. 5)}$$

$$\rho_i(x) = \begin{cases} x & \text{if } |x| \geq T_i \\ \text{sign}(x)(\lambda|x| - T_i) & \text{if } T_i\left(1 - \frac{1}{\lambda}\right) < |x| < T_i \\ 0 & \text{if } |x| \leq T_i\left(1 - \frac{1}{\lambda}\right) \end{cases}, \quad \text{(Eq. 6)}$$

where $\lambda > 1$, or using a sigmoid function. Eq. 4 describes a soft-thresholding operator, Eq. 5 describes a hard thresholding operator, and Eq. 6 describes a "piece-wise affine" thresholding operator. T (and in the case of piece wise affine thresholding, $\lambda$) is chosen to minimize a numerical measure of error, or to satisfy perceptual requirements according to the needs of the person or device that will interpret the reconstructed image. In a typical case, $\lambda$ is ½ and T is three times the estimated standard deviation of the noise in the tomographic data.

Finally, in step 109, the data is recomposed using the inverse decomposition of the wavelet or wavelet packet vector family decomposition performed in step 105. The inverse decomposition process will be known to one skilled in the art and is based on the same techniques utilized in step 105. Thus, where the forward transform utilizes filter bank techniques, the reverse transform uses the same techniques. In the preferred embodiment implemented in the code listing of Appendix A, an inverse transform using a filter bank is employed. The resultant data is image data corresponding to the desired cross-sectional image which may viewed or printed using an apparatus well known to one skilled in the art.

A mathematical representation of the steps performed in steps 101 through 109 follows. Let $B = \{g_i, g^*_i\}_{0 \leq i \leq m}$ with $M \geq N_1 \times N_2 - 1$ be the vector family (previously described) in which the regularization of the data is computed where $\{g^*_j\}_i$ is the dual family of the family of vectors $\{g_i\}_i$, used during the reconstruction process. When $\{g_i\}_i$ is an orthogonal basis, the families g and g* are identical. The diagonal estimator F (which is the matrix of regularized image data) of f is expressed:

$$F = \sum_i \rho_i(\langle R^{-1}Y, g_i\rangle)g_i^*. \quad \text{(Eq. 7)}$$

Figure 2:
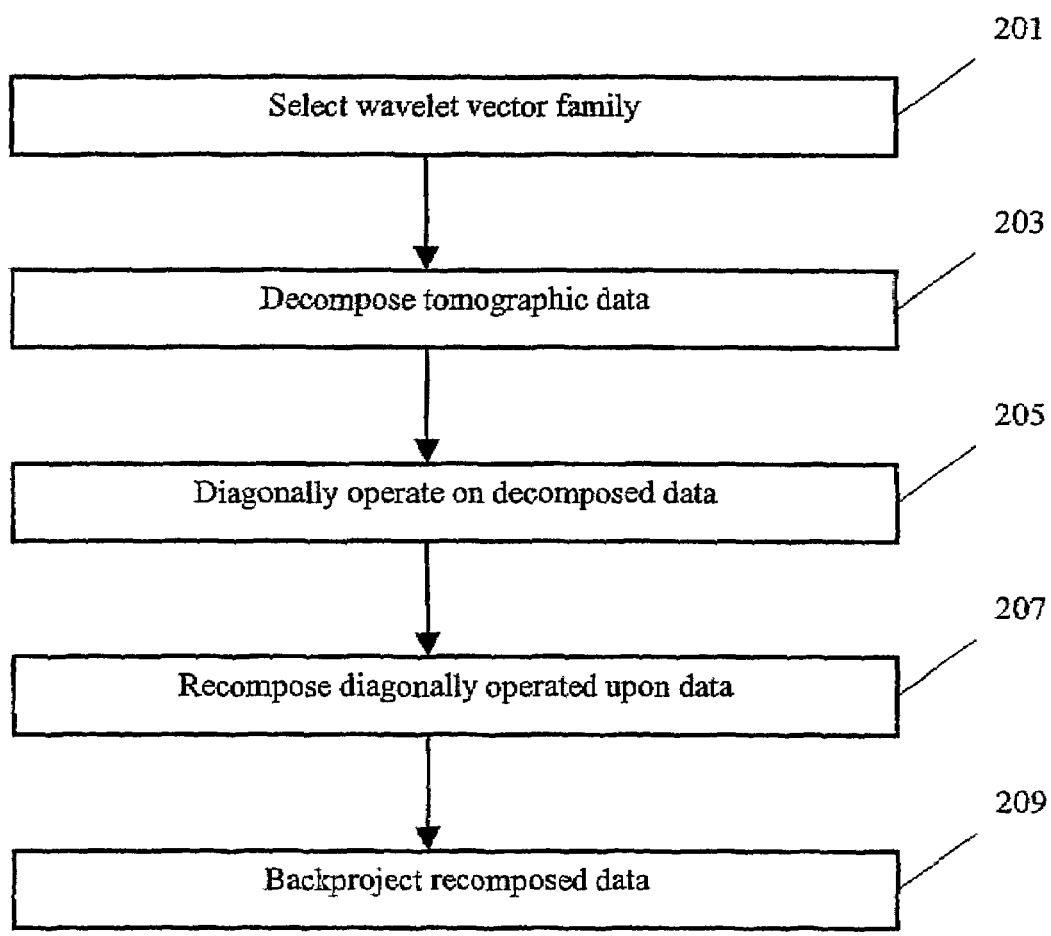
FIG. 2 shows a flow diagram of another embodiment of a method according to the present invention.

FIG. 2 illustrates a slightly modified version of the embodiment described with reference to FIG. 1. In the embodiment of FIG. 2, the step of backprojecting the data 209 occurs last. The backprojection step 209 is identical to backprojection step 101 shown in FIG. 1 in all other respects. The remaining steps shown in FIG. 2 are also identical to the corresponding steps shown in FIG. 1. Thus, step 201 corresponds to step 103. Step 203 corresponds to step 105. Step 205 corresponds to step 107. Step 207 corresponds to step 109. Accordingly, unlike the embodiment illustrated in FIG. 1, the regularization process performed in steps 201 through 207 occurs before application of the inverse operator $R^{-1}$.

A mathematical representation of the steps performed in steps 201 through 209 follows. Let $B = \{g_i, g^*_i\}_{0 \leq i \leq m}$ with $M \geq N_1 \times N_2 - 1$ be the vector family in which the regularization of the data is computed. The diagonal estimator F of f is expressed:

$$F = R^{-1}\left(\sum_i \rho_i(\langle Y, g_i\rangle)g_i^*\right). \quad \text{(Eq. 8)}$$

Figure 3:
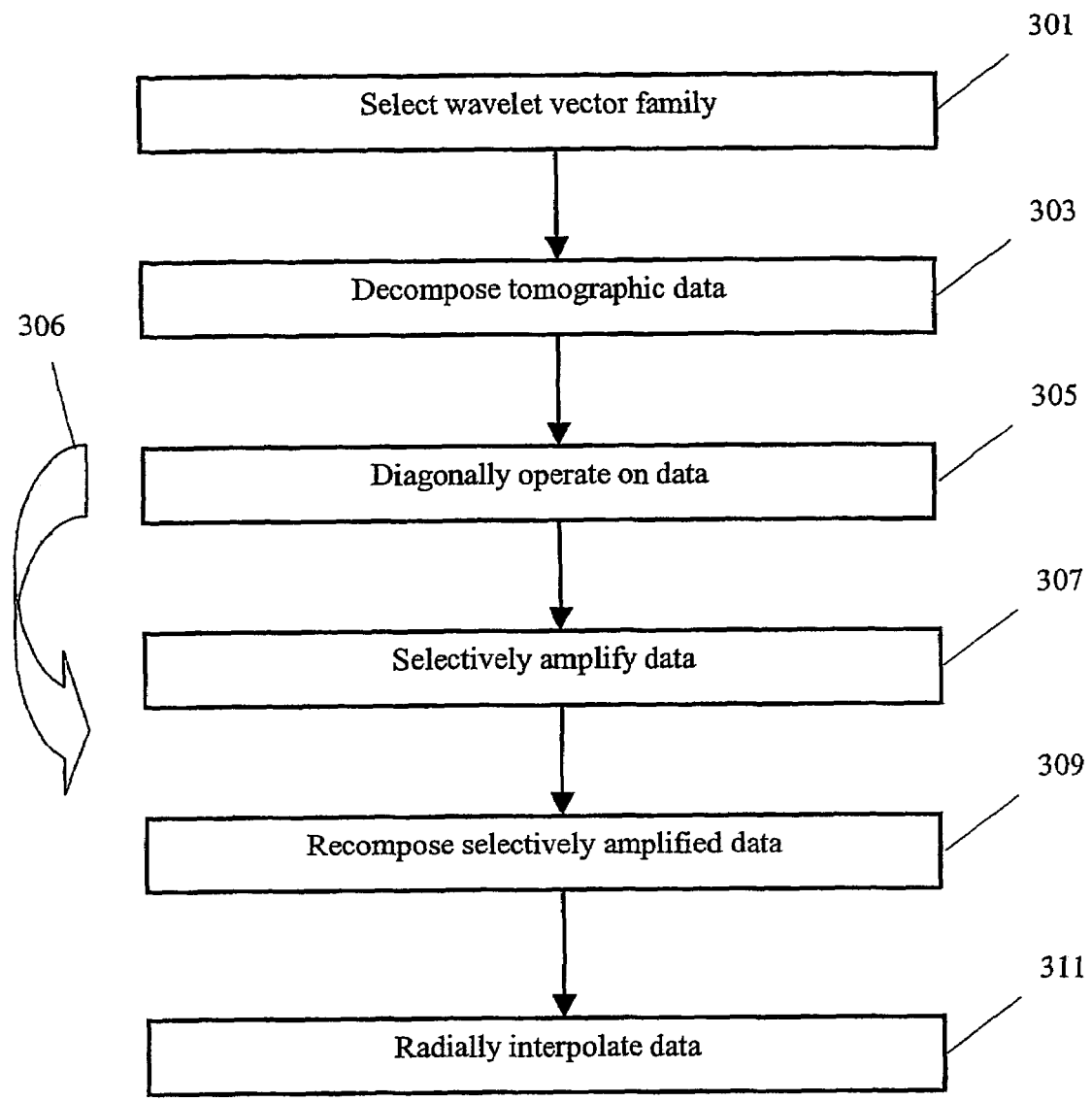
FIG. 3 shows a flow diagram of another embodiment of a method according to the present invention.

FIG. 3 illustrates another embodiment of the present invention, where the process of backprojecting the tomographic data is partially performed during the regularization process. In step 301, a wavelet packet vector family is selected for decomposition of supplied tomographic data. The process is similar to that described above with reference to step 103 in FIG. 1, except that this embodiment requires the use of a wavelet packet or complex wavelet packet frame as the selected vector family.

In step 303, the tomographic data is decomposed using a similar process as described with reference to step 105 in FIG. 1.

In step 305, the data is diagonally operated on in a process similar to that described with reference to step 107 in FIG. 1.

In step 307, the data is selectively amplified. This step consists of amplifying selected wavelet packet coefficients to approximate amplification of the high frequency components of the tomographic projection data. In accordance with this embodiment, it is unnecessary to perform a Fourier transform and its inverse to backproject the tomographic projection data, rather all that is required in addition to the amplification step is radial interpolation described below. Selection of wavelet packet coefficients to amplify in order to approximate the traditional deconvolution step of backprojection will be apparent to one of skill in the art. In a preferred embodiment, each wavelet packet vector has a frequency support which is mostly concentrated on a band of the Fourier domain. In other words, the supports of the Fourier transforms of the various wavelet packets approximately segment the Fourier domain. The deconvolution by a ramp filter function is then approximated by amplifying the coefficients in the wavelet packet space by a value that is the mean value of the ramp filter function on the support of the corresponding wavelet packet vector.

In step 309, the data is recomposed using the inverse decomposition of the wavelet packet decomposition performed in step 303. The process is similar to that described with respect to step 109 in FIG. 1.

Finally, in step 311, the data is radially interpolated to complete backprojection. This step is well known to one skilled in the art and is discussed above with respect to step 101.

As symbolized by arrow 306, the steps of diagonally operating 305 and selectively amplifying data 307 can occur in either order. In other words, step 307 may be performed before step 305.

The embodiments described above could also be combined to improve regularization of the tomographic data. For instance, the embodiment of FIG. 2 could be combined with the embodiment of FIG. 1, beginning with step 201, proceeding through FIG. 2 to step 209 then moving to step 103 of FIG. 1 and proceeding to step 109. In such an instance, the same decomposition vector family B could be used, or two different vector families could be selected during steps 201 and 103.

Additionally, the invention is intended to include regularization of three-dimensional image data in addition to traditional two-dimensional cross-section images. In a three dimensional embodiment of the present invention, a series of tomographic projections of two-dimensional cross-sectional slices of the observed object are provided by a tomographic device. The complete three-dimensional data set is then operated upon, which has the effect of better discriminating between desired information and additive noise.

An example of a three-dimensional embodiment of the present invention is now described with reference to FIG. 1. In step 101, data corresponding to tomographic projections of a series of cross-sectional slices of the observed object are provided and the projections are backprojected for each cross-sectional slice, generating data corresponding to a series of noisy cross-sectional slices of the observed object.

The backprojection step for each cross-sectional slice is identical to that previously described with respect to FIG. 1 in the two-dimensional embodiment.

Although not shown in FIG. 1, it is advantageous that a two-dimensional regularization on each backprojected slice be performed using one of the embodiments previously described before proceeding to step 103.

In step 103, a wavelet or wavelet packet vector family is chosen to decompose the three dimensional data Either one-dimensional, two dimensional or three-dimensional wavelet vector families can be used. The wavelet or wavelet packet vector family can be an orthogonal basis, a biorthogonal basis or a complex or non-complex frame. The chosen vector family is denoted B herein.

In step 105, the data is decomposed in the selected vector family. The step is similar to that previously described in the two-dimensional situation. In a highly preferred embodiment, a three-dimensional dyadic wavelet basis is chosen and the "a trous algorithm" is used to compute the decomposition. This algorithm is another method of performing a translation invariant decomposition and, like translation averaging, is a refinement of the filter bank decompositions previously discussed, although it is implemented differently than the translation averaging technique. The algorithm is an "undecimated" modification of the filter bank algorithm, without subsampling between each wavelet scale. The "a trous algorithm" is well known to one skilled in the art and is described in Mallet supra. An implementation of the "a trous algorithm" in MATLAB code is presented Appendix B.

In step 107, the data is diagonally operated upon using a process similar to that is discussed in the two-dimensional embodiment. In a preferred embodiment, where a three-dimensional dyadic wavelet basis is chosen to decompose the backprojected data, the diagonal operation consists of thresholding the wavelet modulus. Specifically, the dyadic transform is computed with a family of discretized translations and dilations of three wavelets) $\psi^1$, $\psi^2$ and $\psi^3$ that are the partial derivatives of a smoothing function $\phi$. Smoothing functions suitable for this purpose are well known to one skilled in the art and are discussed in Mallet supra. A typical smoothing function is a quadratic spline. Thus:

$$\psi^1(x_1, x_2, x_3) = \frac{\partial \phi(x_1, x_2, x_3)}{\partial x_1}, \psi^2(x_1, x_2, x_3) = \frac{\partial \phi(x_1, x_2, x_3)}{\partial x_2}, \psi^3(x_1, x_2, x_3) = \frac{\partial \phi(x_1, x_2, x_3)}{\partial x_3}.$$

The three-dimensional vector family $\{g_i\}_i$ is then written $\{\psi_j^k\}_{k=1,2,3,j}$. For a given j, the three wavelets have been equally dilated and are translated on the same position, but they respectively have a horizontal, vertical and axial direction.

The decomposed image f has three components which can be written as frame inner products, as:

$$T_j^k f = \langle f, \psi_j^k \rangle, \quad k = 1, 2, 3. \tag{Eq. 9}$$

Because $\psi^1$, $\psi^2$ and $\psi^3$ are partial derivatives of $\phi$, these components are proportional to the coordinates of the gradient vector of f smoothed by a dilated version of $\phi$. From these coordinates, a computation of the angle of the gradient vector is made, which indicates the direction in which the partial derivative of the smoothed image f has the largest amplitude. The amplitude of this maximum partial derivative is equal to the modulus of the gradient vector and is therefore proportional to the wavelet modulus, expressed as:

$$M_j f = \sqrt{|T_j^1 f|^2 + |T_j^2 f|^2 + |T_j^3 f|^2}. \qquad \text{(Eq. 10)}$$

Finally, thresholding of the modulus $M_j f$ is performed, rather than thresholding each wavelet transform component $T_j^k f$ This is equivalent to selecting a direction in which the partial derivative is a maximum and thresholding the amplitude of the partial derivative in this direction. This constitutes an adaptive choice of the wavelet direction in order to best correlate the signal. The coefficients of the dyadic wavelet decomposition are then computed back from the thresholded modulus and the angle of the gradient vector.

In step 109 the data is recomposed to generate a series of regularized cross-sectional slices.

A mathematical representation of the steps performed in steps 101 through 109 for the situation with $N_3$ number of cross-sectional slices follows. Let $B=\{g_i, g^*_i\}_i$ be the vector family in which the regularization of the data is computed. The three-dimensional slice-by-slice backprojected data is:

$$\forall 0 \leq z \leq N_3-1 \; X[.,.,z]=R^{-1}(Y[.,.,z]). \qquad \text{(Eq. 11)}$$

where z corresponds to the axial direction of the object under investigation. The diagonal estimator F of f is:

$$F = \sum_i \rho_i(\langle X, g_i \rangle) g_i^*. \qquad \text{(Eq. 12)}$$

It will be apparent to one skilled in the art that the embodiment illustrated in FIG. 2 could be adapted in a similar manner to operate on three dimensional data as well. In that case, a mathematical representation of the steps performed in steps 201 through 209 for the situation with $N_3$ number of cross-sectional slices follows. The regularized tomographic projection data is given by:

$$\tilde{Y} = \sum_i \rho_i(\langle Y, g_i \rangle) g_i^*. \qquad \text{(Eq. 13)}$$

and the estimator F of f is:

$$\forall 0 \leq z \leq N_3-1 \; F=[.,.,z]=R^{-1}(\tilde{Y}[.,.,z]). \qquad \text{(Eq. 14)}$$

The foregoing merely illustrates the exemplary embodiments of the invention. Various modifications and alterations to the described embodiments will be apparent to those skilled in the art in view of the teachings herein. It will thus be fully appreciated that those skilled in the art will be able to devise numerous systems and methods which, although not explicitly shown or described, embody the principles of the invention and are thus within the spirit and scope of the invention, the scope of the invention being defined only by the appended claims.

APPENDIX A

```
function x = AffineThresh(y,t)
% AffineThresh -- Apply Affine Threshold
%  Usage
%    x = AffineThresh(y,t)
%  Inputs
%    y      Coeff before thresholding
%    t      Threshold
%  Outputs
%    x      Thresholded coeff
% x    = sign(y).*(abs(y) > t/2).*(abs(y) <= t).*(2*abs(y)-t) +
y .* (abs(y) > t);

% J.Kalifa, 2000
```

```
function [basis,value] = Best2dBasis(sqtree,D)
% Best2dBasis -- Coifman-Wickerhauser Best-2d-Basis Algorithm
%  Usage
%    [btree,vtree] = Best2dBasis(sqtree,D)
%  Inputs
%    sqtree    stat-quadtree (output by Calc2dStatTree)
%    D         maximum depth of tree-search
%  Outputs
%    btree     basis-quadtree of best basis
%    vtree     value of components of best basis
%              vtree(1) holds value of best basis
%
%  Description
%    The best-basis algorithm is used to pick out the ``best''
%    basis from all the possible bases in the packet table.
%    Here ``best'' means minimizing an additive measure of
%    information, called entropy by Coifman and Wickerhauser.
%
%    Once the stat-quadtree of entropy values is created, Best2dBasis
%    selects the best basis using the pruning algorithm described in
%    Wickerhauser's book.
%
%  Examples
%    % get best basis for ``image''
%    % use Coiflet 3 filter and CW Entropy
%    [n,D] = quadlength(image);
%    qmf = MakeONFilter('Coiflet',3);
%    sqtree = Calc2dStatTree('WP',image,D,qmf,'Entropy');
%    [btree,vtree] = Best2dBasis(sqtree,D);
%
%  See Also
%    Calc2dStatTree, FPT2_CP, FPT2_WP
%
%  References
%    Wickerhauser, M.V. _Adapted_Wavelet_Analysis_. AK Peters
(1994).
%
          global WLVERBOSE
```

```
            basis = zeros(size(sqtree));
            value = sqtree;
            for d=D-1:-1:0,
                for bx=0:(2^d-1),
                    for by=0:(2^d-1),    % scan tree, bottom->top left->right
scan
                        vparent = sqtree(qnode(d,bx,by));
                        vchild  = value(qnode(d+1,2*bx  ,2*by))   + ...
                                  value(qnode(d+1,2*bx+1,2*by))   + ...
                                  value(qnode(d+1,2*bx  ,2*by+1)) + ...
                                  value(qnode(d+1,2*bx+1,2*by+1));

if(vparent <= vchild),  % if parent better than
children, RU486
                            basis(qnode(d,bx,by)) = 0;
                            value(qnode(d,bx,by)) = vparent;
                        else
                            basis(qnode(d,bx,by)) = 1;
                            value(qnode(d,bx,by)) = vchild;
                        end end
                end
            end
            if strcmp(WLVERBOSE,'Yes')
                fprintf('best basis %g \n',value(1))
            end %
% Copyright (c) 1993. Jonathan Buckheit and David Donoho
%

%
% Part of WaveLab Version 802
% This is Copyrighted Material
% For Copying permissions see COPYING.m
% Comments? e-mail wavelab@stat.stanford.edu
%
```

---

```
function s = cyclespin2(x,i,j)

[l1,l2] = size(x);
z = x((l1+1-i):l1,:);
z(i+1:l1,:) = x(1:(l1-i),:);
s = z(:,(l2+1-j):l2);
s(:,j+1:l2) = z(:,1:(l2-j));

% Written by Maureen Clerc and Jerome Kalifa, 1997
% clerc@cmapx.polytechnique.fr, kalifa@cmapx.polytechnique.fr
```

---

```
function [maxi,tree,T] = Dis2dStatTree(img,D,qmf,I,mult_sigma)

[n,J] = quadlength(img);
```

```
boxlen = n;
boxcnt = 1;
coef = img;
coefI = I;

for d = 0:D,
  for bx=0:(boxcnt-1),
    for by=0:(boxcnt-1),

[lox,hix,loy,hiy] = quadbounds(d,bx,by,n);
      Quad = coef(lox:hix,loy:hiy);
      QuadI = coefI(lox:hix,loy:hiy);

[s1,s2]=size(Quad);
      %
      T_node=sqrt(4*log(n))*sqrt(1/(s1*s2)*sum(sum(QuadI.*QuadI)));
      T_node=mult_sigma*sqrt(1/(s1*s2)*sum(sum(QuadI.*QuadI)));
      r1= abs(Quad) < T_node;
      r2=1-r1;
      p1=Quad.^2;
      pt1=p1.*r1;
      p2=QuadI.^2;
      pt2=p2.*r2;
      tree(qnode(d,bx,by)) = sum(sum(pt1))+sum(sum(pt2));
      T(qnode(d,bx,by)) = T_node;
      maxi(qnode(d,bx,by))=max(max(Quad));

% fin du bloc if d < D,    %   prepare for finer scales
      quad = DownQuad(Quad,qmf,by,bx);
      quadI = DownQuad(QuadI,qmf,by,bx);
      coef(lox:hix,loy:hiy) = quad;
      coefI(lox:hix,loy:hiy) = quadI;
      end
    end
  end
  boxlen = boxlen/2;
  boxcnt = boxcnt*2;
end
```

```
function out = DiscrDenoise2Radon(basis,img,T,qmf,type)
% DiscrDenoise2 -- Denoising of inverse filtered image
%                in best discriminant basis
% Usage
%   out = DiscrDenoise2(basis,img,T,qmf,D, maxi)
%
% See Also
%    WPAnalysis, DisBasis, Discr
%
       [n,J] = quadlength(img);
       coef = img;
%
% initialize tree traversal stack
%
       stack = zeros(3,4*(J+1)+1);
```

```
        k = 1;
        stack(:,k) = [0 0 0]';   % d, bx, by
%
        while(k > 0), % pop stack
            d = stack(1,k);
            bx = stack(2,k);
            by = stack(3,k);
            k=k-1;
            [lox hix loy hiy] = quadbounds(d,bx,by,n);
            Quad = coef(lox:hix,loy:hiy);

if (basis(qnode(d,bx,by)) ~= 0) ,   % nonterminal node
                quad = DownQuad(Quad,qmf,bx,by);
                coef(lox:hix,loy:hiy) = quad;

% push stack
                k = k+1; stack(:,k) = [(d+1)  (2*bx)    (2*by)   ]';
                k = k+1; stack(:,k) = [(d+1)  (2*bx+1)  (2*by)   ]';
                k = k+1; stack(:,k) = [(d+1)  (2*bx)    (2*by+1) ]';
                k = k+1; stack(:,k) = [(d+1)  (2*bx+1)  (2*by+1) ]';
            else
                coef(lox:hix,loy:hiy)=Quad;
                thresh=T(qnode(d,bx,by));
                if strcmp(type,'A'),
                    coef(lox:hix,loy:hiy) = AffineThresh(Quad, thresh);
                end
                if strcmp(type,'S'),
                    coef(lox:hix,loy:hiy) = SoftThresh(Quad, thresh);
                end
                if strcmp(type,'H'),
                    coef(lox:hix,loy:hiy) = HardThresh(Quad, thresh);
                end
            end
        end out = IPT2_WP(basis,coef,qmf);
```

```
function d = DownDyadHi(x,qmf)
% DownDyadHi -- Hi-Pass Downsampling operator (periodized)
%  Usage
%    d = DownDyadHi(x,f)
%  Inputs
%    x    1-d signal at fine scale
%    f    filter
%  Outputs
%    y    1-d signal at coarse scale
%
%  See Also
%    DownDyadLo, UpDyadHi, UpDyadLo, FWT_PO, iconv
%
        d = iconv( MirrorFilt(qmf),lshift(x) );
        n = length(d);
        d = d(1:2:(n-1));
```

%
% Copyright (c) 1993. Iain M. Johnstone
%

%
% Part of WaveLab Version 802
% This is Copyrighted Material
% For Copying permissions see COPYING.m
% Comments? e-mail wavelab@stat.stanford.edu
%

```
function d = DownDyadLo(x,qmf)
% DownDyadLo -- Lo-Pass Downsampling operator (periodized)
%  Usage
%    d = DownDyadLo(x,f)
%  Inputs
%    x    1-d signal at fine scale
%    f    filter
%  Outputs
%    y    1-d signal at coarse scale
%
%  See Also
%    DownDyadHi, UpDyadHi, UpDyadLo, FWT_PO, aconv
%
    d = aconv(qmf,x);
    n = length(d);
    d = d(1:2:(n-1));
```

%
% Copyright (c) 1993. Iain M. Johnstone
%

%
% Part of WaveLab Version 802
% This is Copyrighted Material
% For Copying permissions see COPYING.m
% Comments? e-mail wavelab@stat.stanford.edu
%

```
function q = DownQuad(Quad,qmf,xbit,ybit)
% DownQuad -- Split 2-d image into 4 subbands
%  Usage
%    q = DownQuad(Quad,qmf,xbit,ybit)
%  Inputs
%    Quad    Quadlet to be split into four subbands
%    qmf     orthogonal quadrature mirror filter
%    xbit    x-position of quadlet in 2-d freq plane
%    ybit    y-position of quadlet in 2-d freq plane
%  Outputs
%    q       quadlet after splitting
%
%  Description
%    A 2-d signal is split into four subbands: (Lo_x,Lo_y),
```

```
%       (Lo_x,Hi_y), (Hi_x,Lo_y), (Hi_x,Hi_y).
%
%       This routine is called by other, higher-level WaveLab functions
%       and may not be useful for many users.
%
%   See Also
%       FPT2_WP, UpQuad
%
        [nr,nc] = size(Quad);
        q       = zeros(nr,nc);
        ybit = rem(ybit,2);
        xbit = rem(xbit,2);
%
        bot = 1:(nc/2);
        top = bot + (nc/2);
%
        for i=1:nr,
                lpchan = DownDyadLo(Quad(i,:),qmf);
                hpchan = DownDyadHi(Quad(i,:),qmf);
%               lpchan = ddc(Quad(i,:),qmf);
%               hpchan = ddd(Quad(i,:),qmf);
                if xbit,
                    q(i,top) = lpchan;
                      q(i,bot) = hpchan;
                else
                    q(i,top) = hpchan;
                      q(i,bot) = lpchan;
                end
        end
%
        bot = 1:(nr/2);
        top = bot + (nr/2);
%
        for j=1:nc,
                lpchan = DownDyadLo(q(:,j)',qmf)';
                hpchan = DownDyadHi(q(:,j)',qmf)';
%               lpchan = ddc(q(:,j)',qmf)';
%               hpchan = ddd(q(:,j)',qmf)';
                if ybit,
                    q(top,j) = lpchan;
                      q(bot,j) = hpchan;
                else
                    q(top,j) = hpchan;
                      q(bot,j) = lpchan;
                end
        end %
% Part of WaveLab Version 802
% This is Copyrighted Material
% For Copying permissions see COPYING.m
% Comments? e-mail wavelab@stat.stanford.edu
%
```

```
function
recim=filtback(sinogram,filtertype,X,deltarho,deltax,rhowindow,interp
ol)
% filtback
%
% A routine for computing the inverse Radon transform from a
(rho,theta)
% sinogram.
%
% Peter Toft
% Department of Mathematical Modelling,
% Technical University of Denmark
% 1997 global INTERPOL FILTERTYPE DEBUGLEVEL if length(DEBUGLEVEL)==0
   DEBUGLEVEL=0;
end if nargin==0
   sinogram=zeros(101,100);
   sinogram((1+size(sinogram,1))/2,:)=ones(1,size(sinogram,2));
   here=0
   if DEBUGLEVEL>0,
      figure;
      imagesc(sinogram);
      colorbar;
      colormap(gray(64));
      title('Demo sinogram');
      drawnow
   end
end

[NoRho,NoTheta]=size(sinogram);

if nargin<2
   if length(FILTERTYPE)>0,
      filtertype=FILTERTYPE;
      if DEBUGLEVEL>0
         disp('Using global setting of the variable filtertype');
      end
   else
      filtertype='ramp';
      if DEBUGLEVEL>0
         fprintf('Using default setting of the variable filtertype
%s\n',filtertype);
      end
   end
end if nargin<3
   X=NoRho;
   if DEBUGLEVEL>0
      fprintf('Using default setting of the variable X = %i\n',X);
   end
end
```

```
if nargin<4
  deltarho=1;
  if DEBUGLEVEL>0
     fprintf('Using default setting of the variable deltarho = %f\n',deltarho);
  end
end if nargin<5
  deltax=deltarho;
  if DEBUGLEVEL>0
     fprintf('Using default setting of the variable deltax = %f\n',deltax);
  end
end if nargin<6
  rhowindow=0;
  if DEBUGLEVEL>0
     fprintf('Using default setting of the variable rhowindow = %i\n',rhowindow);
  end
end if nargin<7
  if length(INTERPOL)>0,
     interpol=INTERPOL;
     if DEBUGLEVEL>0
        disp('Using global setting of the variable interpol');
     end
  else
     interpol=1;
     if DEBUGLEVEL>0
        fprintf('Using default setting of the variable interpol = %i\n',interpol);
     end
  end
end % Hann windowing to avoid edge effects if rhowindow==1,
  HannWindow=0.5*(1-cos(2*pi/(NoRho-1)*(0:NoRho-1)))';
  sinogram=sinogram.*(HannWindow*ones(1,NoTheta));
end % Filtering %Valid for nearest neighbour and linear interpolation only maxrho=sqrt(2.0)*(X-1)/2*deltax;
NoRhoExt=max(1+2*ceil(maxrho/deltarho+1),NoRho);

halfadd1NoRho=round(0.5*(NoRhoExt-NoRho));

sinogramext=zeros(NoRhoExt,NoTheta);
```

```
sinogramext(1+halfadd1NoRho:NoRho+halfadd1NoRho,:)=sinogram;

NoRhoExth=(NoRhoExt-1)/2;
if strcmp(lower(filtertype), 'ramp')==1,
   disp('Using Ramp filter')
   filterf=[0:NoRhoExth]*0.5/NoRhoExth/deltarho;
elseif strcmp(lower(filtertype), 'shepplogan')==1,
   disp('Using Shepp Logan filter');
   filterf=sin(pi/2*[0:NoRhoExth]/NoRhoExth)/pi/deltarho;
elseif strcmp(lower(filtertype), 'sine')==1,
   disp('Using sin filter');
   filterf=sin(pi*[0:NoRhoExth]/NoRhoExth)/pi/deltarho*0.5;
else
   disp('Unknown method.')
end filterfunc=[filterf filterf(NoRhoExth:-1:1)]';

%Filtering
fsinogramext=real(ifft(fft(sinogramext).*(filterfunc*ones(1,NoTheta))
));

%if DEBUGLEVEL>1,
%   figure
%   imagesc(fsinogramext)
%   colormap gray
%   colorbar
%   drawnow;
%end % Backprojection
recim=zeros(X,X);

relxar=((0:X-1)-(X-1)/2)*deltax/deltarho;
thetaindices=(0:NoTheta-1);
thetaar=thetaindices/NoTheta*2*pi;
cosar=cos(thetaar);
sinar=sin(thetaar);
xcosar=cosar'*relxar;
ysinar=sinar'*relxar+(NoRhoExt-1)/2;
thetaimat=thetaindices'*ones(1,X);

%xcosar(t,m)=x(m)*cos(theta(t))
%ycosar(t,m)=y(m)*sin(theta(t))+offset if interpol==0,
   for xi=1:X,
      % fprintf ('%4i (%i)\r',xi,X);
      rhomat=ysinar+xcosar(:,xi)*ones(1,X);
      rhoimat=round(rhomat);
      indmat=rhoimat+1+NoRhoExt*thetaimat;
      for yi=1:X,
         recim(yi,xi)=sum(fsinogramext(indmat(:,yi)));
      end
   end
else
   for xi=1:X,
```

```
%       fprintf('%4i (%i)\r',xi,X);
     rhomat=ysinar+xcosar(:,xi)*ones(1,X);
     rhoimat=floor(rhomat);
     drho=rhomat-rhoimat;
     indmat=rhoimat+1+NoRhoExt*thetaimat;
     for yi=1:X,
         recim(yi,xi)=sum(drho(:,yi).*fsinogramext(1+indmat(:,yi))+(1-
drho(:,yi)).*fsinogramext(indmat(:,yi)));
     end
   end
end recim=recim*pi/NoTheta;

recim(:,:)=recim(X:-1:1,:);

fprintf('Done with filtered backprojection\n');

if DEBUGLEVEL>1,
   figure;
   imagesc(recim);
   colorbar;
   colormap(gray(64));
   title('Reconstructed image');
   drawnow;
end
```

```
function x = HardThresh(y,t)
% HardThresh -- Apply Hard Threshold
%  Usage
%    x = HardThresh(y,t)
%  Inputs
%    y      Noisy Data
%    t      Threshold
%  Outputs
%    x      y 1_{|y|>t}
%
    x    = y .* (abs(y) > t);

%
% Copyright (c) 1993-5.  Jonathan Buckheit, David Donoho and Iain
Johnstone
%

%
% Part of WaveLab Version 802
% This is Copyrighted Material
% For Copying permissions see COPYING.m
% Comments? e-mail wavelab@stat.stanford.edu
%
```

```
function y = iconv(f,x)
% iconv -- Convolution Tool for Two-Scale Transform
%  Usage
%    y = iconv(f,x)
```

```
%  Inputs
%    f    filter
%    x    1-d signal
%  Outputs
%    y    filtered result
%
%  Description
%    Filtering by periodic convolution of x with f
%
%  See Also
%    aconv, UpDyadHi, UpDyadLo, DownDyadHi, DownDyadLo
%
        n = length(x);
        p = length(f);
        if p <= n,
            xpadded = [x((n+1-p):n) x];
        else
            z = zeros(1,p);
            for i=1:p,
                    imod = 1 + rem(p*n -p + i-1,n);
                    z(i) = x(imod);
            end
            xpadded = [z x];
        end
        ypadded = filter(f,1,xpadded);
        y = ypadded((p+1):(n+p));

%
% Copyright (c) 1993. David L. Donoho
%

%
% Part of WaveLab Version 802
% This is Copyrighted Material
% For Copying permissions see COPYING.m
% Comments? e-mail wavelab@stat.stanford.edu
%
```

---

```
function img = IPT2_WP(basis,coef,qmf)
% IPT2_WP -- Synthesize image from 2-d wavelet packet coefficients
%  Usage
%    img = IPT2_WP(btree,coef,qmf)
%  Inputs
%    btree    Quad Tree indicating wavelet packet to use
%    coef     2-d wavelet packet coeffts in given basis
%    qmf      quadrature mirror filter
%  Outputs
%    img      2-d image whose 2-d wavelet packet coefft's in
%             basis are coef
%  Description
%    Perform the inverse operation of FPT2_WP.
%
        [n,J] = quadlength(coef);
        img   = coef;
```

```
% initialize tree traversal stack
stack = zeros(4,4*(J+1)+1);
k = 1;
stack(:,k) = [0 0 0 0]'; % d, bx, by, unmarked
%
while(k > 0), % pop stack
        d = stack(1,k);
        bx = stack(2,k); by = stack(3,k);
        marked = stack(4,k); k=k-1;
        % fprintf('d bx by'); disp([d bx by])

if(basis(qnode(d,bx,by)) ~= 0) ,    % nonterminal node if(marked == 0),

% first visit, because unmarked
                    % pushdown (marked) self
                    % pushdown unmarked children k = k+1; stack(:,k) = [d bx by 1]';
                    k = k+1; stack(:,k) = [(d+1) (2*bx)   (2*by)     0]';
                    k = k+1; stack(:,k) = [(d+1) (2*bx+1) (2*by)     0]';
                    k = k+1; stack(:,k) = [(d+1) (2*bx)   (2*by+1)   0]';
                    k = k+1; stack(:,k) = [(d+1) (2*bx+1) (2*by+1)   0]';
            else % second (&last) visit, because marked
                    % reconstruct -- apply UpQuad operator

[lox hix loy hiy] = quadbounds(d,bx,by,n);
                    %fprintf('[lox hix loy hiy]'); disp([lox hix loy hiy])

quad = img(lox:hix,loy:hiy);
                    Quad = UpQuad(quad,qmf,by,bx);
                    img(lox:hix,loy:hiy) = Quad;
            end end
    end
%
% Copyright (c) 1993. David L. Donoho
%

%
% Part of WaveLab Version 802
% This is Copyrighted Material
% For Copying permissions see COPYING.m
```

% Comments? e-mail wavelab@stat.stanford.edu
%

```
function f = MakeONFilter(Type,Par)
% MakeONFilter -- Generate Orthonormal QMF Filter for Wavelet
Transform
%  Usage
%     qmf = MakeONFilter(Type,Par)
%  Inputs
%    Type    string, 'Haar', 'Beylkin', 'Coiflet', 'Daubechies',
%            'Symmlet', 'Vaidyanathan','Battle'
%    Par     integer, it is a parameter related to the support and
vanishing
%            moments of the wavelets, explained below for each
wavelet.
%
%  Outputs
%    qmf     quadrature mirror filter
%
%  Description
%    The Haar filter (which could be considered a Daubechies-2) was
the
%    first wavelet, though not called as such, and is discontinuous.
%
%    The Beylkin filter places roots for the frequency response
function
%    close to the Nyquist frequency on the real axis.
%
%    The Coiflet filters are designed to give both the mother and
father
%    wavelets 2*Par vanishing moments; here Par may be one of 1,2,3,4
or 5.
%
%    The Daubechies filters are minimal phase filters that generate
wavelets
%    which have a minimal support for a given number of vanishing
moments.
%    They are indexed by their length, Par, which may be one of
%    4,6,8,10,12,14,16,18 or 20. The number of vanishing moments is
par/2.
%
%    Symmlets are also wavelets within a minimum size support for a
given
%    number of vanishing moments, but they are as symmetrical as
possible,
%    as opposed to the Daubechies filters which are highly
asymmetrical.
%    They are indexed by Par, which specifies the number of vanishing
%    moments and is equal to half the size of the support. It ranges
%    from 4 to 10.
%
%    The Vaidyanathan filter gives an exact reconstruction, but does
not
%    satisfy any moment condition.  The filter has been optimized for
%    speech coding.
%
```

```
%       The Battle-Lemarie filter generate spline orthogonal wavelet
basis.
%       The parameter Par gives the degree of the spline. The number of
%       vanishing moments is Par+1.
%
%       See Also
%         FWT_PO, IWT_PO, FWT2_PO, IWT2_PO, WPAnalysis
%
%       References
%         The books by Daubechies and Wickerhauser.
% if strcmp(Type,'Haar'),
        f = [1 1] ./ sqrt(2);
end if strcmp(Type,'Beylkin'),
        f = [ .099305765374       .424215360813       .699825214057    ...
              .449718251149      -.110927598348      -.264497231446
        ...
              .026900308804       .155538731877      -.017520746267
        ...
             -.088543630623       .019679866044       .042916387274
        ...
             -.017460408696      -.014365807969       .010040411845
        ...
              .001484234782      -.002736031626       .000640485329
        ];
end if strcmp(Type,'Coiflet'),
        if Par==1,
                f = [ .038580777748      -.126969125396      -.077161555496
        ...
                      .607491641386       .745687558934
        .226584265197      ];
        end
        if Par==2,
                f = [ .016387336463      -.041464936782      -.067372554722
        ...
                      .386110066823       .812723635450
        .417005184424       ...
                     -.076488599078      -.059434418646
        .023680171947       ...
                      .005611434819      -.001823208871       -
        .000720549445      ];
        end
        if Par==3,
                f = [ -.003793512864      .007782596426       .023452696142
        ...
                     -.065771911281      -.061123390003
        .405176902410       ...
                      .793777222626       .428483476378       -
        .071799821619       ...
                     -.082301927106       .034555027573
        .015880544864       ...
```

```
                             -.009007976137     -.002574517688
        .001117518771        ...
                             .000466216960      -.000070983303     -
.000034599773       ];
        end
        if Par==4,
             f = [ .000892313668     -.001629492013    -.007346166328
        ...
                             .016068943964      .026682300156      -
.081266699680       ...
                             -.056077313316     .415308407030
        .782238930920        ...
                             .434386056491      -.066627474263     -
.096220442034       ...
                             .039334427123      .025082261845      -
.015211731527       ...
                             -.005658286686     .003751436157
        .001266561929        ...
                             -.000589020757     -.000259974552
        .000062339034        ...
                             .000031229876      -.000003259680     -
.000001784985       ];
        end
        if Par==5,
             f = [ -.000212080863    .000358589677     .002178236305
        ...
                             -.004159358782     -.010131117538
        .023408156762        ...
                             .028168029062      -.091920010549     -
.052043163216       ...
                             .421566206729      .774289603740
        .437991626228        ...
                             -.062035963906     -.105574208706
        .041289208741        ...
                             .032683574283      -.019761779012     -
.009164231153       ...
                             .006764185419      .002433373209      -
.001662863769       ...
                             -.000638131296     .000302259520
        .000140541149        ...
                             -.000041340484     -.000021315014
        .000003734597        ...
                             .000002063806      -.000000167408     -
.000000095158       ];
        end
end if strcmp(Type,'Daubechies'),
        if Par==4,
             f = [ .482962913145     .836516303738      ...
                             .224143868042      -.129409522551     ];
        end
        if Par==6,
             f = [ .332670552950     .806891509311      ...
                             .459877502118      -.135011020010     ...
                             -.085441273882     .035226291882     ];
        end
```

```
    if Par==8,
        f = [          .230377813309       .714846570553      ...
                       .630880767930      -.027983769417      ...
                      -.187034811719       .030841381836      ...
                       .032883011667      -.010597401785      ];
    end
    if Par==10,
        f = [ .160102397974       .603829269797       .724308528438
...
                       .138428145901      -.242294887066      -
.032244869585      ...
                       .077571493840      -.006241490213      -
.012580751999      ...
                       .003335725285
                       ];
    end
    if Par==12,
        f = [ .111540743350       .494623890398       .751133908021
...
                       .315250351709      -.226264693965      -
.129766867567      ...
                       .097501605587       .027522865530      -
.031582039317      ...
                       .000553842201       .004777257511      -
.001077301085     ];
    end
    if Par==14,
        f = [ .077852054085       .396539319482       .729132090846
...
                       .469782287405      -.143906003929      -
.224036184994      ...
                       .071309219267       .080612609151      -
.038029936935      ...
                      -.016574541631       .012550998556
        .000429577973      ...
                      -.001801640704       .000353713800
                       ];
    end
    if Par==16,
        f = [ .054415842243       .312871590914       .675630736297
...
                       .585354683654      -.015829105256      -
.284015542962      ...
                       .000472484574       .128747426620      -
.017369301002      ...
                      -.044088253931       .013981027917
        .008746094047      ...
                      -.004870352993      -.000391740373
        .000675449406      ...
                      -.000117476784
                       ];
    end
    if Par==18,
        f = [ .038077947364       .243834674613       .604823123690
...
                       .657288078051       .133197385825      -
.293273783279      ...
```

```
                            -.096840783223       .148540749338
        .030725681479   ...
                            -.067632829061       .000250947115
        .022361662124   ...
                            -.004723204758      -.004281503682
        .001847646883   ...
                             .000230385764      -.000251963189
        .000039347320   ];
        end
        if Par==20,
            f = [ .026670057901       .188176800078       .527201188932
    ...
                             .688459039454       .281172343661       -
.249846424327   ...
                            -.195946274377       .127369340336
        .093057364604   ...
                            -.071394147166      -.029457536822
        .033212674059   ...
                             .003606553567      -.010733175483
        .001395351747   ...
                             .001992405295      -.000685856695       -
.000116466855   ...
                             .000093588670      -.000013264203
                        ];
        end
end if strcmp(Type,'Symmlet'),
        if Par==4,
            f = [ -.107148901418      -.041910965125       .703739068656
    ...
                             1.136658243408      .421234534204       -
.140317624179   ...
                            -.017824701442       .045570345896
                        ];
        end
        if Par==5,
            f = [ .038654795955       .041746864422      -.055344186117
    ...
                             .281990696854      1.023052966894
        .896581648380   ...
                             .023478923136      -.247951362613       -
.029842499869   ...
                             .027632152958
                        ];
        end
        if Par==6,
            f = [ .021784700327       .004936612372      -.166863215412
    ...
                            -.068323121587       .694457972958
        1.113892783926  ...
                             .477904371333      -.102724969862       -
.029783751299   ...
                             .063250562660       .002499922093        -
.011031867509   ];
        end
        if Par==7,
```

```
        f = [ .003792658534    -.001481225915    -.017870431651
...
                .043155452582    .096014767936    -
.070078291222    ...
                .024665659489    .758162601964
    1.085782709814    ...
                .408183939725    -.198056706807    -
.152463871896    ...
                .005671342686    .014521394762
            ];
    end
    if Par==8,
        f = [ .002672793393    -.000428394300    -.021145686528
...
                .005386388754    .069490465911    -
.038493521263    ...
                -.073462508761   .515398670374
    1.099106630537    ...
                .680745347190    -.086653615406    -
.202648655286    ...
                .010758611751    .044823623042    -
.000766690896    ...
                -.004783458512
            ];
    end
    if Par==9,
        f = [ .001512487309    -.000669141509    -.014515578553
...
                .012528896242    .087791251554    -
.025786445930    ...
                -.270893783503   .049882830959
    .873048407349    ...
                1.015259790832   .337658923602    -
.077172161097    ...
                .000825140929    .042744433602    -
.016303351226    ...
                -.018769396836   .000876502539
    .001981193736    ];
    end
    if Par==10,
        f = [ .001089170447    .000135245020    -.012220642630
...
                -.002072363923   .064950924579
    .016418869426    ...
                -.225558972234   -.100240215031
    .667071338154    ...
                1.088251530500   .542813011213    -
.050256540092    ...
                -.045240772218   .070703567550
    .008152816799    ...
                -.028786231926   -.001137535314
    .006495728375    ...
                .000080661204    -.000649589896
            ];
    end
end
```

```
if strcmp(Type,'Vaidyanathan'),
    f = [ -.000062906118    .000343631905   -.000453956620  ...
          -.000944897136    .002843834547    .000708137504
          ...
          -.008839103409    .003153847056    .019687215010
          ...
          -.014853448005   -.035470398607    .038742619293
          ...
           .055892523691   -.077709750902   -.083928884366
          ...
           .131971661417    .135084227129   -.194450471766
          ...
          -.263494802488    .201612161775    .635601059872
          ...
           .572797793211    .250184129505    .045799334111
        ];
end if strcmp(Type,'Battle'),
    if Par == 1,
        g = [0.578163    0.280931   -0.0488618   -0.0367309 ...
             0.012003    0.00706442 -0.00274588  -0.00155701 ...
             0.000652922 0.000361781 -0.000158601 -0.0000867523
            ];
    end if Par == 3,
        g = [0.541736    0.30683    -0.035498    -0.0778079 ...
             0.0226846   0.0297468   -0.0121455  -0.0127154 ...
             0.00614143  0.00579932  -0.00307863 -0.00274529 ...
             0.00154624  0.00133086  -0.000780468 -0.00065562 ...
             0.000395946 0.000326749 -0.000201818 -0.000164264 ...
             0.000103307
            ];
    end if Par == 5,
        g = [0.528374    0.312869   -0.0261771   -0.0914068 ...
             0.0208414   0.0433544   -0.0148537  -0.0229951  ...
             0.00990635  0.0128754   -0.00639886 -0.00746848 ...
             0.00407882  0.00444002  -0.00258816 -0.00268646 ...
             0.00164132  0.00164659  -0.00104207 -0.00101912 ...
             0.000662836 0.000635563 -0.000422485 -0.000398759 ...
             0.000269842 0.000251419 -0.000172685 -0.000159168 ...
             0.000110709 0.000101113
            ];
    end
    l = length(g);
    f = zeros(1,2*l-1);
    f(1:2*l-1) = g;
    f(1:l-1) = reverse(g(2:l));
end f = f ./ norm(f);
```

% Copyright (c) 1993-5. Jonathan Buckheit and David Donoho
%
%
% Part of WaveLab Version 802
% This is Copyrighted Material
% For Copying permissions see COPYING.m
% Comments? e-mail wavelab@stat.stanford.edu
%

```
function [maxi,tree,T] = NonPrior2dStatTree(img,D,qmf,I,mult_sigma)

[n,J]  = quadlength(img);
boxlen = n;
boxcnt = 1;
coef   = img;
coefI  = I;

for d = 0:D,
  for bx=0:(boxcnt-1),
    for by=0:(boxcnt-1),

[lox,hix,loy,hiy] = quadbounds(d,bx,by,n);
      Quad  = coef(lox:hix,loy:hiy);
      QuadI = coefI(lox:hix,loy:hiy);

[s1,s2]=size(Quad);

sigma=sqrt(1/(s1*s2)*sum(sum(QuadI.*QuadI)));

%        [y,estim] = NormNoise(Quad,qmf);
%        sigma=1/estim

T_node=mult_sigma*sigma;

r1= abs(Quad) < T_node;
      r2=1-r1;
      Quad=sign(Quad).*(abs(Quad)-sigma);
      p1=Quad.^2;
      pt1=p1.*r1;
      p2=(T_node^2+sigma^2)*ones(size(Quad));
      pt2=p2.*r2;
      tree(qnode(d,bx,by)) = sum(sum(pt1))+sum(sum(pt2));
      T(qnode(d,bx,by)) = T_node;
      maxi(qnode(d,bx,by))=max(max(Quad));

% fin du bloc if d < D, % prepare for finer scales
      quad  = DownQuad(Quad,qmf,by,bx);
      quadI = DownQuad(QuadI,qmf,by,bx);
      coef(lox:hix,loy:hiy)  = quad;
      coefI(lox:hix,loy:hiy) = quadI;
```

```
            end
        end
    end
    boxlen = boxlen/2;
    boxcnt = boxcnt*2;
end
```

```
function [y,coef] = NormNoise(x,qmf)
% NormNoise -- Estimates noise level, Normalize signal to noise level
1
%   Usage
%      [y,coef] = NormNoise(x,qmf)
%   Inputs
%     x      1-d signal
%     qmf    quadrature mirror filter
%   Outputs
%     y      1-d signal, scaled so wavelet coefficients
%            at finest level have median absolute deviation 1.
%     coef   estimation of 1/sigma
%
%   Description
%     This is required pre-processing to use any of the DeNoising
%     tools on naturally-occurring data.
%
%   See Also
%     WaveShrink, CPDeNoise,WPDeNoise
%
        u = DownDyadHi(x,qmf);
        s = median(abs(u));
        if s ~= 0
            y =   .6745 .* x ./s;
                coef = .6745 /s;
        else
            y = x;
                coef = 1;
        end %
% Copyright (c) 1993-5.  Jonathan Buckheit, David Donoho and Iain Johnstone
%
% Modified by Maureen Clerc and Jerome Kalifa, 1997
% clerc@cmapx.polytechnique.fr, kalifa@cmapx.polytechnique.fr
%

%
% Part of WaveLab Version 802
% This is Copyrighted Material
% For Copying permissions see COPYING.m
% Comments? e-mail wavelab@stat.stanford.edu
%
```

```
function ix = qnode(d,bx,by)
% qnode -- Quad tree indexing
%   Usage
```

```
%    ix = qnode(d,bx,by)
% Inputs
%    d        depth in splitting
%    bx,by    box coordinates at that depth
% Outputs
%    ix       index of that node in tree
%
% Description
%    ix = 4^(d) + by + bx*2^(d)
% ix = 4^(d) + by + bx*2^(d);

%
% Part of WaveLab Version 802
% This is Copyrighted Material
% For Copying permissions see COPYING.m
% Comments? e-mail wavelab@stat.stanford.edu
%
```

```
function [lox,hix,loy,hiy] = quadbounds(d,bx,by,n)
% quadbounds -- x,y bounds of quadlet
% Usage
%    [lox,hix,loy,hiy] = quadbounds(d,bx,by,n)
% Inputs
%    d        depth in splitting
%    bx,by    box coordinates at that depth
%    n        extent of image
% Outputs
%    lox      lower x-index of quadlet
%    loy      lower y-index of quadlet
%    hix      upper x-index of quadlet
%    hiy      upper y-index of quadlet
%
% Description
%    This routine is called by other, higher-level Wavelab functions
%    and is not intended to be useful for most users.
%
    boxsize = n/(2^d);
    lox = bx*boxsize+1;
    loy = by*boxsize+1;
    hix = (bx+1)*boxsize;
    hiy = (by+1)*boxsize;

%
% Part of WaveLab Version 802
% This is Copyrighted Material
% For Copying permissions see COPYING.m
% Comments? e-mail wavelab@stat.stanford.edu
%
```

```
function [n,J] = quadlength(x)
% quadlength -- Find length and dyadic length of square matrix
% Usage
```

```
%       [n,J] = quadlength(x)
% Inputs
%    x     2-d image; size(n,n), n = 2^J (hopefully)
% Outputs
%    n     length(x)
%    J     least power of two greater than n
%
% Side Effects
%    A warning message is issue if n is not a power of 2,
%    or if x is not a square matrix.
%
        s = size(x);
        n = s(1);
        if s(2) ~= s(1),
                disp('Warning in quadlength: nr != nc')
        end
        k = 1 ; J = 0; while k < n , k=2*k; J = 1+J ; end ;
        if k ~= n ,
                disp('Warning in quadlength: n != 2^J')
        end %
% Copyright (c) 1993. David L. Donoho
%

%
% Part of WaveLab Version 802
% This is Copyrighted Material
% For Copying permissions see COPYING.m
% Comments? e-mail wavelab@stat.stanford.edu
%
```

```
function x = SoftThresh(y,t)
% SoftThresh -- Apply Soft Threshold
%  Usage
%     x = SoftThresh(y,t)
%  Inputs
%     y      Noisy Data
%     t      Threshold
%  Outputs
%     x      sign(y)(|y|-t)_+
%
        res = (abs(y) - t);
        res = (res + abs(res))/2;
        x   = sign(y).*res;

%
% Copyright (c) 1993-5.  Jonathan Buckheit, David Donoho and Iain Johnstone
%

%
% Part of WaveLab Version 802
% This is Copyrighted Material
```

```
% For Copying permissions see COPYING.m
% Comments? e-mail wavelab@stat.stanford.edu
% function
Inv_Recons=SPECTMacrTomoFiltback(num,preDenoise,postDenoise,mult_pre,
mult_post,fileproj,type1,type2)
%
% Macro for tomographic reconstruction methods using SPECT Interfile
data
% With an adaptive selection of the wavelet packet basis
% dime=128;

sino = Decodefile(fileproj, num);
sino(:,:)=Big2Little(sino(:,:));
Theta=0:2.82:360;         % Projection angles % Estimation of the Noise level qmf = MakeONFilter('Symmlet',4);

[y,coef] = NormNoise(sino,qmf);
sigma=1/coef

Inv_Degr=filtback(sino);

if postDenoise==1
    % Uncomment if you want to use a Phantom Image as prior model for
the
    % image %    Phant=raw2mat('phantom128.gray',128,128);
    B=(randn(size(sino)))*sigma;   % Noise generation Inv_B= filtback(B);

D=3;
    % If one uses a Phantom to choose the basis

% [maxi,tree,T] = Dis2dStatTree(Phant,D,qmf,Inv_B,mult_post);

% If one uses the degraded data to choose the basis

[maxi,tree,T] =
NonPrior2dStatTree(Inv_Degr,D,qmf,Inv_B,mult_post);

btree    = Best2dBasis(tree,D);
    %       ax = axis; hold;
    %       Plot2dPartition(btree,'y',ax,D);
    Rest_best=zeros(size(Inv_Degr));
    lim=2;

for i=1:lim,
       for j=1:lim,
```

```
    [Inv_Degrtrans] = cyclespin2(Inv_Degr,i,j);
    [Rest] =DiscrDenoise2Radon(btree,Inv_Degrtrans,0*T,qmf,'H');
    [Rest]   = cyclespin2(Rest,dime-i,dime-j);
    Rest_best = Rest_best+Rest;
    end
  end Rest_best=Rest_best/(lim*lim);
  Inv_Recons=Rest_best;
end %
% (c) Jérôme Kalifa, 2000
% kalifa@columbia.edu
%
```

```
function Rest_best=SPECTTomo(num,mult,fileproj,type)

% size of the images dime=128;

% Read Interfile projections for the slice #num sino = Decodefile(fileproj, num);

% Big Endian --> Little Endian sino(:,:)=Big2Little(sino(:,:));

% Projection angles

Theta=0:2.82:360;

% Filter to be used by the wavelet(packet) transform qmf = MakeONFilter('Symmlet',4);

% D= 2 or 3 is fine (3 slightly better, but slower);
D=2;

% Simulation of the backprojected noise, 1st alternative

[y,coef] = NormNoise(sino,qmf);
sigma=1/coef;
B=(randn(size(sino)))*sigma;

% 2nd alternative, using numerical measurements

%out=ThreshWave2(sino,'H');
%B=sino-out;

% Generation of the backprojected noise, and measurement of the
amplitude of
```

```
% its coefficients in the WP tree. NB: If the noise B has been generated
% with 1st alternative, it is possible to avoid this step by storing a array
% A of noise amplification values for the WP coefficiens, and computing
% AmpNoise=sigma.*A .

Inv_B= filtback(B);
AmpNoise= TomoStatTree(D,qmf,Inv_B);

% Wavelet packet basis we want to use.

if D==2;
   btree      = zeros(1,31);
   btree(1)=1;
   btree(5:6)=[1 1];
elseif D==3;
   btree      = zeros(1,127);
   btree(1)=1;
   btree(5:7)=[1 1 1];
   btree(26:27)=[1 1];
   btree(30:31)=[1 1];
end % Reconstruction by BackProjection, just ramp filtering Inv_Degr=filtback(sino);

% Initialisation of the final image

Rest_best=zeros(dime,dime);

% Translation-invariance. lim=4 slightly better than lim=2, but slower.
lim=2;

% Denoising in the wavelet packet tree.

for i=1:lim,
   for j=1:lim,
      [Inv_Degrtrans] = cyclespin2(Inv_Degr,i,j);
      [Rest] = TomoDenoise(btree,Inv_Degrtrans,AmpNoise,qmf,type,mult);
      [Rest]    = cyclespin2(Rest,dime-i,dime-j);
      Rest_best = Rest_best+Rest;
   end
end Rest_best=Rest_best/(lim*lim);
Rest_Int=Rest_best;

% Denoising in the wavelet tree

Rest_best=zeros(size(Rest_Int));
btree=zeros(size(btree));
btree(1)=1;
btree(4)=1;
```

```
lim=2;

for i=1:lim,
   for j=1:lim,
      [Rest_Inttrans] = cyclespin2(Rest_Int,i,j);
      [Rest] =TomoDenoise(btree,Rest_Inttrans,AmpNoise,qmf,'H',mult);
      [Rest]   = cyclespin2(Rest,dime-i,dime-j);
      Rest_best = Rest_best+Rest;
   end
end % Regularized reconstructed image Rest_best=Rest_best/(lim*lim);

%
% (c) Jérôme Kalifa, 2001
% kalifa@columbia.edu
%
```

```
function out=ThreshWave2Aff(Noisy,type,TI,sigma,mult,L,qmf)
%  ThreshWave2 -- Denoising of 2-d image with wavelet thresholding.
%  Usage
%     out=ThreshWave2(Noisy,type,TI,sigma,mult,L,qmf)
%  Inputs
%     Noisy   2-d Noisy image, size(Noisy)= 2^J*2^J.
%     type         'S' for soft thresholding, 'H' for hard
thresholding.
%              Optional, Default=hard thresholding.
%     TI           Enter 1 if you want translation-invariant
denoising,
%              0 if you don't.
%              Optional, Default=non-invariant.
%     sigma        Standard deviation of additive Gaussian White
Noise.
%              Enter 0 if you want sigma to be estimated by median
filtering.
%              Optional, Default=estimated by median filtering.
%     mult         Multiplier of sigma to obtain the value of the
threshold.
%              Optional, Default = sqrt(2*log(n)), where n is the
%              number of pixels/
%     L           Low-Frequency cutoff for shrinkage (e.g. L=4)
%              Should have L << J!
%              Optional, Default = 3.
%     qmf         Quadrature Mirror Filter for Wavelet Transform
%              Optional, Default = Symmlet 4.
%  Outputs
%     out          Estimate, obtained by applying thresholding on
%              wavelet coefficients.
% n=length(Noisy);
   if nargin < 7,
      qmf = MakeONFilter('Symmlet',4);
   end
   if nargin < 6,
```

```
        L = 3;
    end
    if nargin < 5,
        mult = sqrt(4*log(n));
    end
    if nargin < 4,
        [y,coef] = NormNoise(Noisy,qmf);
        sigma=1/coef;
    end
    if nargin < 3,
        TI = 0;
    end
    if nargin < 2,
        type = 'H';
    end if sigma==0,
        [y,coef] = NormNoise(Noisy,qmf);
        sigma=1/coef;
    end thresh= sigma*mult;
    out=zeros(1,n);

if TI==1,
        if strcmp(type,'S'),
        out=TIDenoiseSoft2(Noisy,L,qmf,thresh);
        end
        if strcmp(type,'H'),
        out=TIDenoiseHard2(Noisy,L,qmf,thresh);
        end
        if strcmp(type,'A'),
        out=TIDenoiseAffine2(Noisy,L,qmf,thresh);
        end
    else
        if strcmp(type,'S'),
            out=ST2(Noisy,L,qmf,thresh);
        end
        if strcmp(type,'H'),
            out=HT2(Noisy,L,qmf,thresh);
        end
        if strcmp(type,'A'),
            out=AT2(Noisy,L,qmf,thresh);
        end
    end % Written by Maureen Clerc and Jerome Kalifa, 1997
% clerc@cmapx.polytechnique.fr, kalifa@cmapx.polytechnique.fr %
% Part of WaveLab Version 802
% This is Copyrighted Material
```

```
% For Copying permissions see COPYING.m
% Comments? e-mail wavelab@stat.stanford.edu
%
```

```
function out = TomoDenoise(basis,img,AmpNoise,qmf,type,mult)
%
% Usage
%    out = TomoDenoise(basis,img,T,qmf,D,type)
%
       [n,J] = quadlength(img);
       coef  = img;
%
% initialize tree traversal stack
%
       stack = zeros(3,4*(J+1)+1);
       k = 1;
       stack(:,k) = [0 0 0]';    % d, bx, by
%
       while(k > 0), % pop stack
              d  = stack(1,k);
              bx = stack(2,k);
              by = stack(3,k);
              k=k-1;
              [lox hix loy hiy] = quadbounds(d,bx,by,n);
              Quad = coef(lox:hix,loy:hiy);

if(basis(qnode(d,bx,by)) ~= 0) ,    % nonterminal node
                     quad = DownQuad(Quad,qmf,bx,by);
                     coef(lox:hix,loy:hiy) = quad;

% push stack
                     k = k+1; stack(:,k) = [(d+1)  (2*bx)    (2*by)    ]';
                     k = k+1; stack(:,k) = [(d+1)  (2*bx+1)  (2*by)    ]';
                     k = k+1; stack(:,k) = [(d+1)  (2*bx)    (2*by+1)  ]';
                     k = k+1; stack(:,k) = [(d+1)  (2*bx+1)  (2*by+1)  ]';
              else
                     coeff_max=max(max(abs(Quad)));
                     if (coeff_max > (6.*AmpNoise)),
                        thresh=mult.*AmpNoise(qnode(d,bx,by));
                        if strcmp(type,'A'),
                           coef(lox:hix,loy:hiy) = AffineThresh(Quad,
thresh);
                        end
                        if strcmp(type,'S'),
                           coef(lox:hix,loy:hiy) = SoftThresh(Quad,
thresh);
                        end
                        if strcmp(type,'H'),
                           coef(lox:hix,loy:hiy) = HardThresh(Quad,
thresh);
                        end
                     else
                        % coeff_max
```

```
                        coef(lox:hix,loy:hiy) = zeros(hix-lox+1,hiy-loy+1);
                end
            end
        end out = IPT2_WP(basis,coef,qmf);
```

```
function AmpNoise = TomoStatTree(D,qmf,I)

[n,J]   = quadlength(I);
boxlen = n;
boxcnt = 1;
coefI = I;

for d = 0:D,
   for bx=0:(boxcnt-1),
      for by=0:(boxcnt-1),

[lox,hix,loy,hiy] = quadbounds(d,bx,by,n);
         QuadI = coefI(lox:hix,loy:hiy);

[s1,s2]=size(QuadI);
         AmpNoise_node= sqrt(1/(s1*s2)*sum(sum(QuadI.*QuadI)));
         AmpNoise(qnode(d,bx,by)) = AmpNoise_node;

%  prepare for finer scales
         if d < D,
         quadI = DownQuad(QuadI,qmf,by,bx);
         coefI(lox:hix,loy:hiy) = quadI;
         end
      end
   end boxlen = boxlen/2;
   boxcnt = boxcnt*2;
end
```

```
function Q = UpQuad(quad,qmf,xbit,ybit)
% UpQuad -- Merge four subbands into 2d image
%  Usage
%    Q = UpQuad(quad,qmf,xbit,ybit)
%  Inputs
%    Quad    quadlet to be joined 4->1 channel
%    qmf     orthogonal quadrature mirror filter
%    xbit    x-position of quadlet in 2-d freq plane
%    ybit    y-position of quadlet in 2-d freq plane
%  Outputs
%    q       quadlet after splitting
%
%  Description
%    A 2-d signal split into four channels: (Lo_x,Lo_y),
%    (Lo_x,Hi_y), (Hi_x,Lo_y), (Hi_x,Hi_y) is unsplit
%    into original image.
%
%    This routine is called by other, higher-level WaveLab
```

```
%    functions and may not be useful for many users.
%
% See Also
%    IPT2_WP, DownQuad
%
    [nr,nc] = size(quad);
    Q       = zeros(nr,nc);
    ybit = rem(ybit,2);
    xbit = rem(xbit,2);
%
    bot = 1:(nr/2);
    top = bot + (nr/2);
%
    for j=1:nc,
        if ybit,
            lpchan = quad(top,j)';
                hpchan = quad(bot,j)';
        else
            lpchan = quad(bot,j)';
                hpchan = quad(top,j)';
        end Q(:,j) = UpDyadLo(lpchan,qmf)' + UpDyadHi(hpchan,qmf)';
    end
%
    bot = 1:(nc/2);
    top = bot + (nc/2);
%
    for i=1:nr,
        if xbit,
            lpchan = Q(i,top);
                hpchan = Q(i,bot);
        else
            lpchan = Q(i,bot);
                hpchan = Q(i,top);
        end Q(i,:) = UpDyadLo(lpchan,qmf) + UpDyadHi(hpchan,qmf);
    end
%

%
% Part of WaveLab Version 802
% This is Copyrighted Material
% For Copying permissions see COPYING.m
% Comments? e-mail wavelab@stat.stanford.edu
```

APPENDIX B

```
function dwt = FWT_ATrou(x,L);
%
% FWT_ATrou -- Fast Dyadic Wavelet Transform (periodized, orthogonal)
%  Usage
%    dwt = FWT_ATrou(x,L)
%  Inputs
%    x      1-d signal; length(x) = 2^J = n
%    L      Coarsest Level of V_0;  L << J
%  Outputs
%    dwt    an n times J-L+1 matrix
%           giving the wavelet transform of x at all dyadic scales.
%
%  Description
%    To reconstruct use IWT_ATrou
%
%  See Also
%    IWT_ATrou, MakeATrouFilter
%

[lodyadf,dlodyadf,hidyadf,dhidyadf] = MakeATrouFilter('Spline',3);

[n,J] = dyadlength(x) ;
D = J-L;
dwt = zeros(n,D+1);
x = ShapeAsRow(x);
dwt(:,1) = x';

for d = 1:D,
  s = dwt(:,1)';
  s2 = s;
  for j = 1:2^(d-1)
    s2 = lshift(s2);
  end
  dwt(:,d+1) = iconv(hidyadf,s)';
  for j = 1:2^(d)
    p = lshift(dwt(:,d+1)');
    dwt(:,d+1) = p';
  end
  dwt(:,1) = iconv(lodyadf,s2)';

f = zeros(1,2*length(lodyadf));
  f(1:2:2*length(lodyadf)-1) = lodyadf;

f2 = zeros(1,2*length(hidyadf));
  f2(1:2:2*length(hidyadf)-1) = hidyadf;

lodyadf = f;
  hidyadf = f2;
end;

% Written by Maureen Clerc and Jerome Kalifa, 1997
% clerc@cmapx.polytechnique.fr, kalifa@cmapx.polytechnique.fr
```

```
%
% Part of WaveLab Version 802
% This is Copyrighted Material
% For Copying permissions see COPYING.m
% Comments? e-mail wavelab@stat.stanford.edu
%
```

```
function s = IWT_ATrou(dwt,L);
%
% IWT_ATrou -- Inverse Dyadic Wavelet Transform
%  Usage
%     s = IWT_ATrou(dwt,L)
%  Inputs
%     dwt   an n times J-L+1 matrix
%     L     Coarsest Level of V_0;  L << J
%  Outputs
%     s        original 1-d signal; length(x) = 2^J = n
%  Description
%     1. filters are obtained with MakeATrouFilter
%     2. usually, length(qmf) < 2^(L+1)
%     3. The transformed signal can be obtained by FWT_ATrou
%  See Also
%     FWT_ATrou, MakeATrouFilter
%
[n,b] = size(dwt );
J=b+L-1;
if ~(2^J==n)
   fprintf('problem in matrix dimensions');
end
s = dwt(:,1)';
D = b-1;
[lodyadf,dlodyadf,hidyadf,dhidyadf] = MakeATrouFilter('Spline',3);

f = zeros(1,2^(D-1)*length(dlodyadf));
f(1:2^(D-1):2^(D-1)*length(dlodyadf)+1-2^(D-1)) = dlodyadf;

f2 = zeros(1,2^(D-1)*length(dhidyadf));
f2(1:2^(D-1):2^(D-1)*length(dhidyadf)+1-2^(D-1)) = dhidyadf;

for d= D-1:-1:0
   for j = 1:2.*2^(d),2
      s = lshift(s);
   end
   for j = 1:2^(d+1)
      p = rshift(dwt(:,d+2)');
      dwt(:,d+2) = p';
   end for j = 1:3.*2^(d),
      p=lshift(dwt(:,d+2)');
      dwt(:,d+2)=p';
   end
   s=0.5*(iconv(f,s)+iconv(f2,dwt(:,d+2)'));

f = zeros(1,2^(d-1)*length(dlodyadf));
   f(1:2^(d-1):2^(d-1)*length(dlodyadf)+1-2^(d-1)) = dlodyadf;
```

```
        f2 = zeros(1,2^(d-1)*length(dhidyadf));
        f2(1:2^(d-1):2^(d-1)*length(dhidyadf)+1-2^(d-1)) = dhidyadf;
end % Written by Maureen Clerc and Jerome Kalifa, 1997
% clerc@cmapx.polytechnique.fr, kalifa@cmapx.polytechnique.fr %
% Part of WaveLab Version 802
% This is Copyrighted Material
% For Copying permissions see COPYING.m
% Comments? e-mail wavelab@stat.stanford.edu
%
```

```
function y = lshift(x)
% lshift -- Circular left shift of 1-d signal
%  Usage
%    l = lshift(x)
%  Inputs
%    x    1-d signal
%  Outputs
%    l    1-d signal
%         l(i) = x(i+1) except l(n) = x(1)
% y = [ x( 2:length(x) ) x(1) ];

%
% Copyright (c) 1993. Iain M. Johnstone
%

%
% Part of WaveLab Version 802
% This is Copyrighted Material
% For Copying permissions see COPYING.m
% Comments? e-mail wavelab@stat.stanford.edu
%
```

```
function [lodyadf,dlodyadf,hidyadf,dhidyadf] =
MakeATrouFilter(Type,Par)
%
% MakeATrouFilter -- Generate Biorthonormal Quadratic Spline Filter
Pair
%
%  Usage
%    [lodyadf,dlodyadf,hidyadf,dhidyadf] = MakeATrouFilter(Type,Par)
%  Inputs
%    Type     string, one of:
%             'Spline'
%    Par      Par = 3 only
%
% Outputs
%    lodyadf         low-pass dyadic filter
```

```
%     dlodyadf    dual low-pass dyadic filter
%     hidyadf     high-pass dyadic filter
%     dhidyadf    dual high-pass dyadic filter
      sqrt2 = sqrt(2);
      if strcmp(Type,'Spline'),
          lodyadf = [0.125 0.375 0.375 0.125].*sqrt2;
% for Haar
%         lodyadf = [0. 0.5 0.5 0].*sqrt2;
          dlodyadf = [0.125 0.375 0.375 0.125].*sqrt2;
          hidyadf = [.5 -.5] .*sqrt2;
          dhidyadf = [-.03125 -.21875 -.6875 .6875 .21875 .03125].*sqrt2;
      end % Written by Maureen Clerc and Jerome Kalifa, 1997
% clerc@cmapx.polytechnique.fr, kalifa@cmapx.polytechnique.fr %
% Part of WaveLab Version 802
% This is Copyrighted Material
% For Copying permissions see COPYING.m
% Comments? e-mail wavelab@stat.stanford.edu
%
```

```
function row = ShapeAsRow(sig)
% ShapeAsRow -- Make signal a row vector
%  Usage
%    row = ShapeAsRow(sig)
%  Inputs
%    sig     a row or column vector
%  Outputs
%    row     a row vector
%
%  See Also
%    ShapeLike
%
row = sig(:)';
```

```
%
% Part of WaveLab Version 802
% This is Copyrighted Material
% For Copying permissions see COPYING.m
% Comments? e-mail wavelab@stat.stanford.edu
%
```

The invention claimed is:

1. A method for reconstructing image data corresponding to a desired two-dimensional image from initial tomographic data associated with a plurality of initial tomographic projections of said desired image, comprising:
   backprojecting said initial tomographic data to form backprojected image data;
   selecting a vector family to decompose said backprojected image data from the group consisting of 1-D orthogonal wavelet packet basis, 2-D orthogonal wavelet packet basis, 1-D biorthogonal wavelet packet basis, 2-D biorthogonal wavelet packet basis, 1-D wavelet packet frame, 2-D wavelet packet frame, 1-D complex wavelet frame, 2-D complex wavelet frame, 1-D complex wavelet packet frame, and 2-D complex wavelet packet frame;
   decomposing said backprojected image data to generate decomposed coefficients associated with said selected vector family;
   diagonally operating on said decomposed coefficients to generate modified decomposed coefficients; and
   recomposing said image data corresponding to said desired two-dimensional image from said modified decomposed coefficients.

2. A method for reconstructing image data corresponding to a desired two-dimensional image from initial tomographic data associated with a plurality of initial tomographic projections of said desired image, comprising:
   selecting a vector family to decompose said initial tomographic data from the group consisting of 1-D orthogonal wavelet packet basis, 2-D orthogonal wavelet packet basis, 1-D biorthogonal wavelet packet basis, 2-D biorthogonal wavelet packet basis, 1-D wavelet packet frame, 2-D wavelet packet frame, 1-D complex wavelet frame, 2-D complex wavelet frame, 1-D complex wavelet packet frame, and 2-D complex wavelet packet frame;
   decomposing said initial tomographic data into decomposed coefficients associated with said selected vector family;
   diagonally operating on said decomposed coefficients to generate modified decomposed coefficients; and
   recomposing said modified decomposed coefficients to generate regularized data associated with a plurality of regularized tomographic projections; and
   backprojecting said regularized data to form said image data corresponding to said desired two-dimensional image.

3. A method for reconstructing image data corresponding to a desired two-dimensional image from initial tomographic data associated with a plurality of initial tomographic projections of said desired image, comprising:
   selecting a vector family to decompose said initial tomographic data from the group consisting of 1-D orthogonal wavelet packet basis, 2-D orthogonal wavelet packet basis, 1-D biorthogonal wavelet packet basis, 2-D biorthogonal wavelet packet basis, 1-D wavelet packet frame, 2-D wavelet packet frame, 1-D complex wavelet frame, and 2-D complex wavelet packet frame;
   decomposing said initial tomographic data into decomposed coefficients associated with said selected vector family;
   diagonally operating on said decomposed coefficients to generate modified decomposed coefficients;
   selectively amplifying said modified decomposed coefficients to generate selectively amplified coefficients;
   recomposing said selectively amplified coefficients to generate regularized data associated with a plurality of regularized tomographic projections; and
   radially interpolating said regularized data to form said image data corresponding to said desired two-dimensional image.

4. A method for reconstructing image data corresponding to a desired two-dimensional image from initial tomographic data associated with a plurality of initial tomographic projections of said desired image, comprising:
   selecting a vector family to decompose said initial tomographic data from the group consisting of 1-D orthogonal wavelet packet basis, 2-D orthogonal wavelet packet basis, 1-D biorthogonal wavelet packet basis, 2-D biorthogonal wavelet packet basis, 1-D wavelet packet frame, 2-D wavelet packet frame, 1-D complex wavelet packet frame, and 2-D complex wavelet packet frame;
   decomposing said initial tomographic data into decomposed coefficients associated with said selected vector family;
   selectively amplifying said decomposed coefficients to generate selectively amplified coefficients;
   diagonally operating on said selectively amplified coefficients to generate modified decomposed coefficients;
   recomposing said modified decomposed coefficients to generate regularized data associated with a plurality of regularized tomographic projections; and
   radially interpolating said regularized data to form said image data corresponding to said desired two-dimensional image.

5. The method of claim 1, 2, 3 or 4 wherein said diagonally operating comprises thresholding the data operated on.

6. The method of claim 1, 2, 3 or 4 wherein said selecting a vector family step further comprises:
   deriving a model of noise present in said data to be decomposed;
   repeatedly selecting a wavelet packet decomposition from a predetermined plurality of wavelet packet decompositions;
   calculating an estimation of final estimation error based on at least said selected wavelet packet decomposition and said noise model; and
   choosing a wavelet packet decomposition that minimizes the estimation of final estimation error calculated in said repeatedly selecting step.

7. The method of claim 6 wherein said calculating an estimation of final estimation error is also based on prior information about said desired two-dimensional image.

8. A method for reconstructing image data corresponding to a plurality of two-dimensional slices of a desired three-dimensional image from initial tomographic data associated with a plurality of tomographic projections of said plurality of two-dimensional slices, comprising:
   selecting a vector family to decompose said initial tomographic data selected from the group consisting of wavelet vector family and wavelet packet vector family;
   decomposing said initial tomographic data to generate decomposed coefficients associated with said selected vector family;
   diagonally operating on said decomposed coefficients to generate modified decomposed coefficients; and
   recomposing said modified decomposed coefficients to generate regularized data associated with a plurality of regularized tomographic projections of said plurality of two-dimensional slices of said desired image; and backprojecting said regularized data to form said image data corresponding to said plurality of two-dimensional slices of said desired three-dimensional image.

9. A method for reconstructing image data corresponding to a plurality of two-dimensional slices of a desired three-dimensional image from initial tomographic data associated with a plurality of tomographic projections of said plurality of two-dimensional slices, comprising:

backprojecting said initial tomographic data to form backprojected image data associated with said plurality of two-dimensional slices;

selecting a wavelet vector family to decompose said backprojected image data;

decomposing said backprojected image data to generate decomposed coefficients associated with said selected vector family;

diagonally operating on said decomposed coefficients to generate modified decomposed coefficients; and recomposing said modified decomposed coefficients to form said image data corresponding to said plurality of two-dimensional slices of said desired three-dimensional image.

10. The method of claim 8 further comprising performing slice-by-slice two-dimensional regularization on said initial tomographic data to form regularized data corresponding to a series of regularized two-dimensional slices before said decomposing step wherein said decomposing step is performed on the entirety of said regularized data.

11. The method of claim 9 further comprising performing slice-by-slice two-dimensional regularization on said initial tomographic data to form regularized data corresponding to a series of regularized two-dimensional slices before said backprojecting step wherein said backprojecting step is performed slice-by-slice on the entirety of said regularized data.

12. The method of claim 9 further comprising performing slice-by-slice two-dimensional regularization on said backprojected image data to form regularized data corresponding to a series of regularized two-dimensional slices before said decomposing step wherein said decomposing step is performed on the entirety of said regularized data.

13. The method of claim 8 or 9 wherein said diagonally operating comprises thresholding the data operated on.

14. The method of claim 8 or 9 wherein said selecting a vector family step further comprises:

deriving a model of noise present in said data to be decomposed;

repeatedly selecting a wavelet packet decomposition from a predetermined plurality of wavelet packet decompositions;

calculating an estimation of final estimation error based on at least said selected wavelet packet decomposition and said noise model; and choosing a wavelet packet decomposition that minimizes the estimation of final estimation error calculated in said repeatedly selecting step.

15. The method of claim 14, wherein said calculating an estimation of final estimation error is also based on prior information about said plurality of two dimensional slices of said desired three-dimensional image.

* * * * *